(12) United States Patent
Kokubo et al.

(10) Patent No.: US 7,375,846 B2
(45) Date of Patent: May 20, 2008

(54) IMAGE FORMING DEVICE CAPABLE OF SORTING ACQUIRED DATA

(75) Inventors: Masatoshi Kokubo, Ama-gun (JP); Kazuma Aoki, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 948 days.

(21) Appl. No.: 10/379,683

(22) Filed: Mar. 6, 2003

(65) Prior Publication Data
US 2003/0184796 A1 Oct. 2, 2003

(30) Foreign Application Priority Data
Mar. 27, 2002 (JP) .............................. 2002-088732

(51) Int. Cl.
*G06K 15/00* (2006.01)
(52) U.S. Cl. ...................... 358/1.6; 358/1.16; 358/1.18
(58) Field of Classification Search ............... 358/1.15, 358/1.1, 1.16, 500, 501, 524, 401, 400, 399, 358/403, 402, 474, 1.6, 1.18; 346/107.3; 709/247; D14/462–471
See application file for complete search history.

(56) References Cited

U.S. PATENT DOCUMENTS

| | | | | |
|---|---|---|---|---|
| 6,100,995 A | * | 8/2000 | Itoh | ........................ 358/1.16 |
| 6,132,117 A | * | 10/2000 | Fukano et al. | ................ 400/76 |
| 6,168,327 B1 | * | 1/2001 | Tsuzuki | ...................... 400/188 |
| 6,281,989 B1 | * | 8/2001 | Tomida | ....................... 358/442 |
| 6,304,335 B1 | * | 10/2001 | Furuya et al. | ............. 358/1.15 |
| 6,570,672 B1 | * | 5/2003 | Hattori | ........................ 358/1.2 |
| 6,678,066 B1 | * | 1/2004 | Nakamura | .................. 358/1.13 |
| 6,687,415 B1 | * | 2/2004 | Kanamaru | .................. 382/276 |
| 6,906,822 B1 | * | 6/2005 | Nohnishi | ................... 358/1.16 |
| 2002/0116544 A1 | * | 8/2002 | Barnard et al. | ............ 709/324 |

FOREIGN PATENT DOCUMENTS

| | | |
|---|---|---|
| JP | A 05-095455 | 4/1993 |
| JP | A 09-214742 | 8/1997 |
| JP | A 11-055496 | 2/1999 |
| JP | A 11-164071 | 6/1999 |
| JP | A 2000-099304 | 4/2000 |

* cited by examiner

*Primary Examiner*—Jerome Grant, II
(74) *Attorney, Agent, or Firm*—Oliff & Berridge, PLC

(57) ABSTRACT

A facsimile device includes a communication module for communicating with a web server connected to the Internet. A web printing unit of the communication module receives data from the web server, and adds accumulated data information indicating a saving position of the received data to a corresponding data file if the received data conforms to predetermined sorting conditions. When the amount of received data for which the accumulated data information has been stored in the data file exceeds one page worth, then n-pages worth of received data is converted into print data and recorded in a print FIFO.

17 Claims, 14 Drawing Sheets

FIG.5(a)
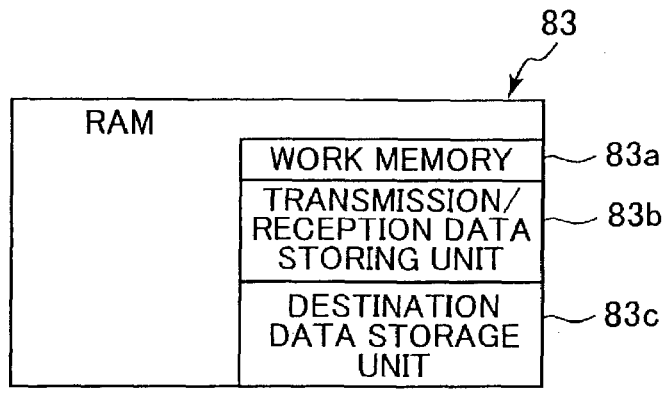
FIG.5(b)
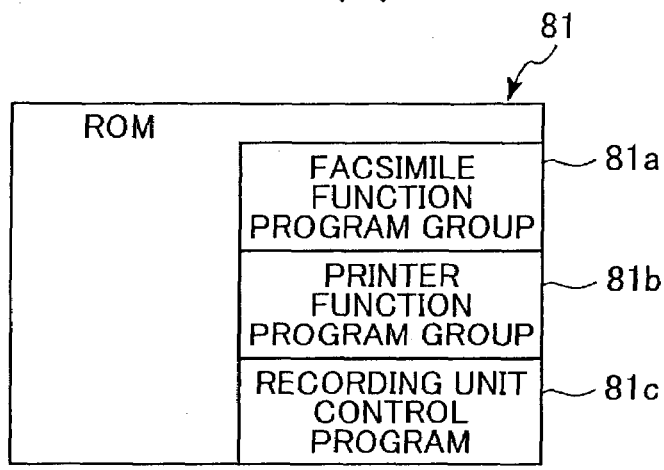
FIG.5(c)
(DESTINATION DATA STORAGE UNIT 83c)
| DESTINATION 1 | 0 3 - * * * * - * * * * |
| --- | --- |
| | a a a @ * * * . c o . j p |
| DESTINATION 2 | 0 6 - * * * * - * * * * |
| | b b b @ * * * . c o . j p |
| DESTINATION 3 | 0 5 2 - * * * * - * * * * |
| | c c c @ * * * . c o . j p |
| ⋮ | ⋮ |
| DESTINATION n | TELEPHONE NUMBER |
| | E-MAIL ADDRESS |

FIG.6(a)
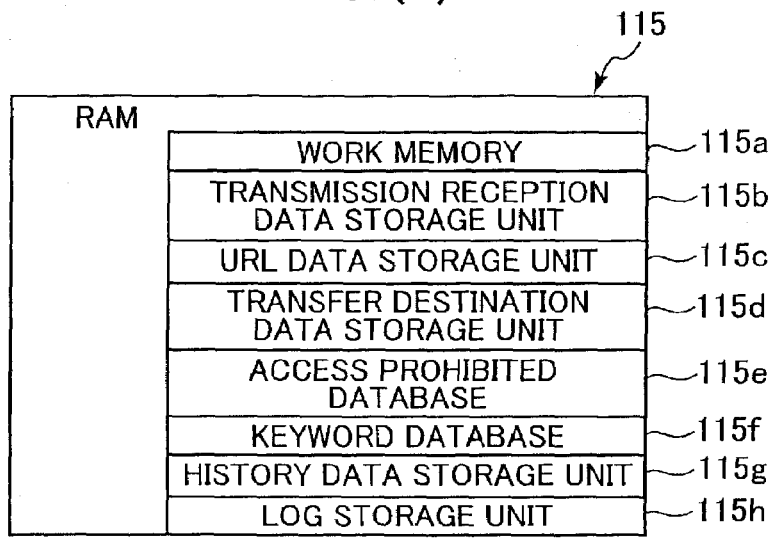
FIG.6(b)
FIG.6(c)
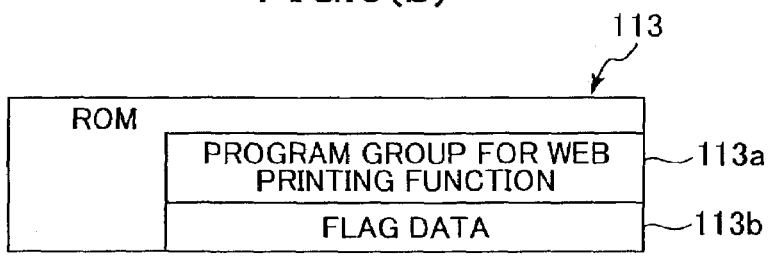

FIG.14

(PRINT CONTROL DATA STORING UNIT 115i)

| CONTROL NUMBER | SORTING CONDITIONS | DATA FILE | OPERATING MODE | PRINT ENDPOINT | CONSECUTIVE FLAG |
|---|---|---|---|---|---|
| 1 | TRANSMISSION SOURCE = "○○.com" | ○○.dat | NORMAL ACCUMULATING PRINT | 0 | OFF |
| 2 | TYPE = "newspaper heading" TRANSMISSION SOURCE = "□□.com" | Newspaper heading.dat | NORMAL ACCUMULATING PRINT | 0 | OFF |
| 3 | TRANSMISSION SOURCE = "△△.com" | △△.dat | CONTINUOUS PRINT | 2000 | OFF |
| 4 | TYPE = "log data" | Log data.dat | CONTINUOUS PRINT | 1000 | ON |
| 5 | TYPE = "snapshot" | SnapShot.dat | NORMAL ACCUMULATING PRINT | 0 | OFF |
| ... | ...... | ... | ... | ... | ... |

IMAGE FORMING DEVICE CAPABLE OF SORTING ACQUIRED DATA

BACKGROUND OF THE INVENTION

1. Field of the Invention

The present invention relates to an image forming device capable of receiving data via a network from an external source.

2. Description of the Related Art

Some printers well known in the art as image forming devices are configured to connect to a network, receive print data from a personal computer or the like on the network, and form images on recording paper based on the print data. Of these network-connectable printers that have become popular in recent years, there are those well known in the art that take in a new sheet of recording paper of a fixed size, such as A3, A4, B5, and the like, and form images based on print data for each unit of print data entered as a print job.

In recent years, network environments have been established throughout society as the popularity of the Internet continues to grow, and there has been a trend, toward expanding the applications of printers by making use of these networks to enable printers to process various types of data.

For example, it is conceivable to provide data as printed materials to a user on a regular basis by directing a printer to acquire and print new data periodically via a network. For example, it is possible to direct a printer to acquire snapshots taken from a surveillance camera and providing the data to a user, or to supply the latest news or the like to a user.

However, a large amount of recording paper may be consumed when printing data at regular intervals. That is, the amount of data received each time is often quite small. For example, data that does not even fill up half a sheet of recording paper may be printed numerous times. Since conventional printers introduce a new sheet of recording paper and print data each time data is received, this will result in a large consumption of recording paper and a waste of paper resources.

SUMMARY OF THE INVENTION

In view of the foregoing, it is an object of the present invention to provide an image forming device capable of reducing the amount of recording paper consumption, and also a method and program for controlling the image forming device.

In order to achieve the above and other objects, according to the present invention, there is provided an image forming device including an image forming unit that forms images on a recording medium, a supply unit that supplies a recording medium to the image forming unit, a receiving unit that receives image data via a network from an external source, a memory that stores image data, a storing unit that stores image data into the memory each time the receiving unit receives image data by appending the image data to any image data already stored in the memory, a control unit that controls the image forming unit and the supply unit, a determining unit that determines whether or not a data amount of image data stored in the memory is equal to or greater than a predetermined amount, and an input unit that inputs image data stored in the memory into the control unit when the determining unit determines that the data amount is equal to or greater than the predetermined amount. Upon reception of image data, the control unit controls the supply unit to supply a recording medium to the image forming unit and also controls the image forming unit to form images based on the image data on the recording medium supplied by the supply unit.

There is also provided a program for controlling an image forming device. The program includes the programs of a) storing image data into a memory each time a receiving unit receives image data via a network from an external source, by appending the image data to any image data already stored in the memory, b) determining whether or not the data amount of image data stored in the memory is equal to or greater than a predetermined amount, c) inputting image data stored in the memory into a control unit collectively when the data amount is determined to be equal to or greater than the predetermined amount, and d) supplying a recording medium to an image forming device and controlling the image forming device to form images on the recording medium based on the image data that has been input to the control unit in the program c).

This type of program can be recorded and supplied on a recording medium such as a compact disc, magnetic disc, or magneto-optic disc.

There is also provided a control method of controlling an image forming device. The control method includes the steps of a) storing image data into a memory each time a receiving unit receives image data via a network from an external source, by appending the image data to any image data already stored in the memory, b) determining whether or not the data amount of image data stored in the memory is equal to or greater than a predetermined amount, c) inputting image data stored in the memory into a control unit collectively when the data amount is determined to be equal to or greater than the predetermined amount, and d) supplying a recording medium to an image forming device and controlling the image forming device to form images on the recording medium based on the image data that has been input to the control unit in the step c).

BRIEF DESCRIPTION OF THE DRAWINGS

In the drawings:

FIG. 5(a) is an explanatory diagram illustrating data structure of a RAM of a main unit shown in FIG. 4;

FIG. 5(b) is an explanatory diagram illustrating data structure of a ROM of the main unit;

FIG. 5(c) is an explanatory diagram illustrating data structure of a destination data storage unit of the RAM of FIG. 5(a);

FIG. 6(a) is an explanatory diagram showing data structure in RAM a web printing unit shown in FIG. 4;

FIG. 6(b) is an explanatory diagram showing data structure in a ROM of the web printing unit;

FIG. 6(c) is an explanatory diagram showing data structure of a URL data storage unit of FIG. 6(a);

FIG. 14 is an explanatory diagram showing the configuration of a print control table stored in a print control data storing unit.

DESCRIPTION OF THE PREFERRED EMBODIMENT

Next, an image forming device according to a preferred embodiment of the present invention will be described while referring to the accompanying drawings.

Figure 1:
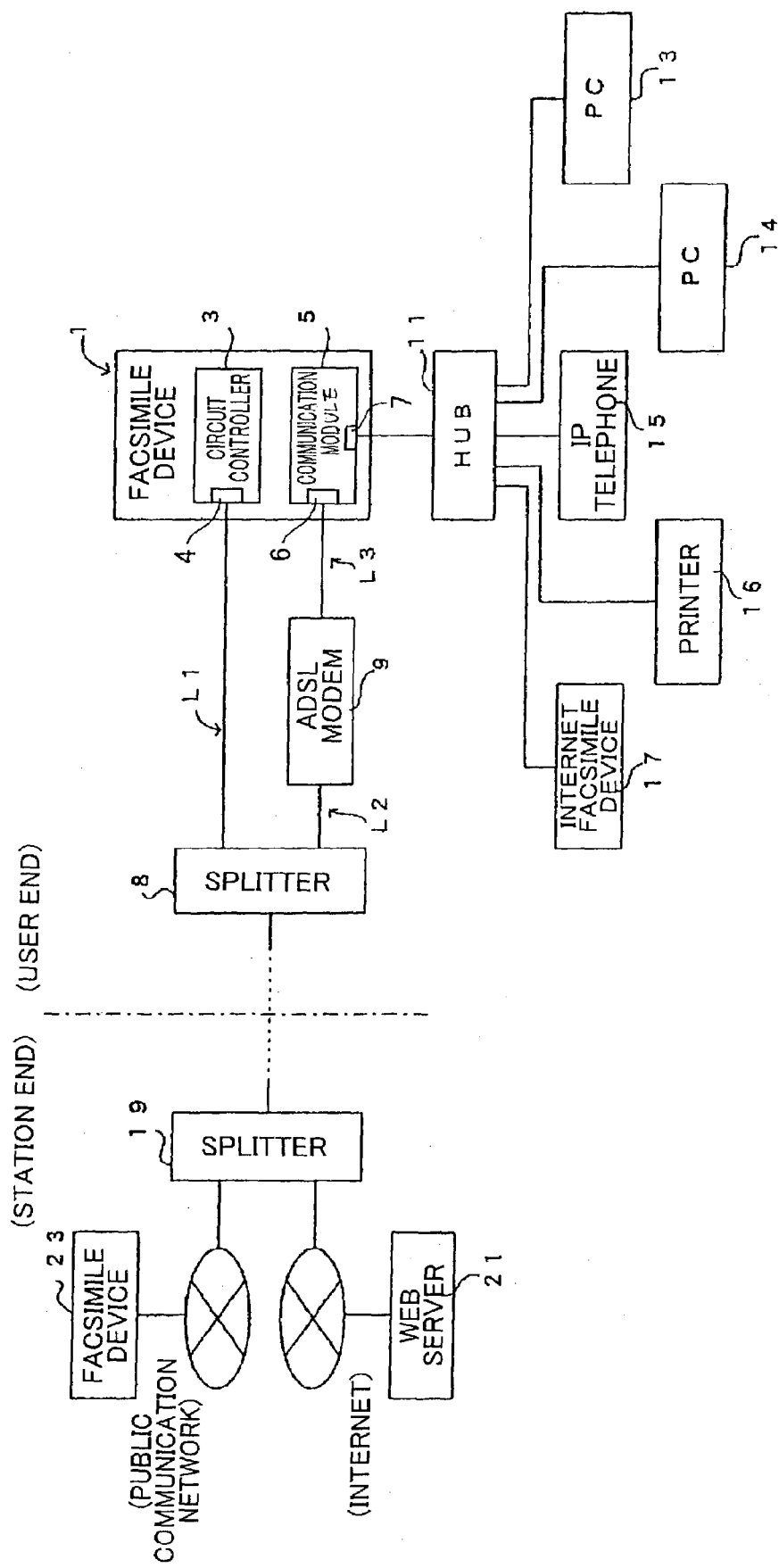
FIG. 1 is a block diagram illustrating an example of using a facsimile device of the preferred embodiment.
Figure 2:
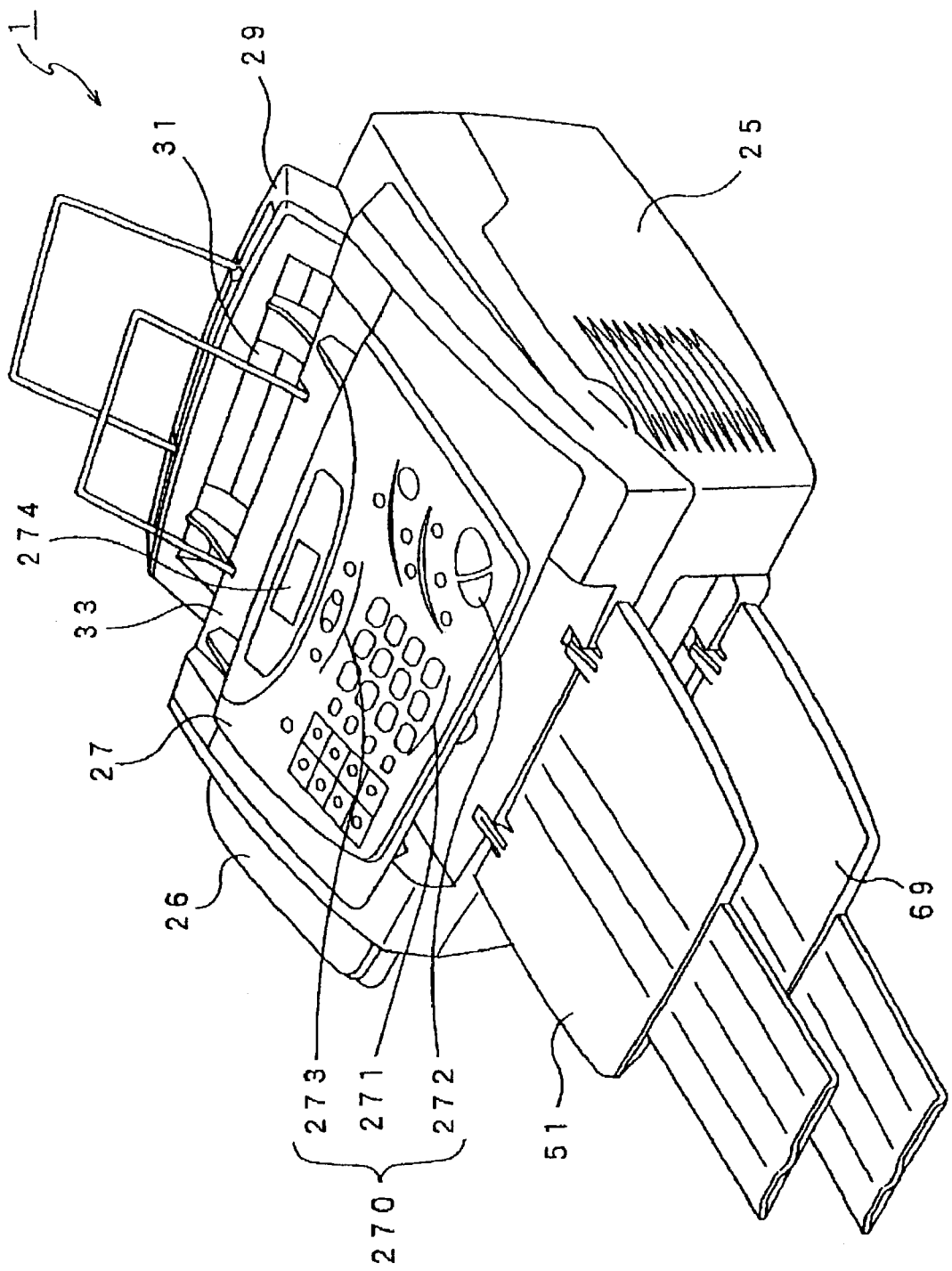
FIG. 2 is a perspective view showing the external construction of the facsimile device.
Figure 3:
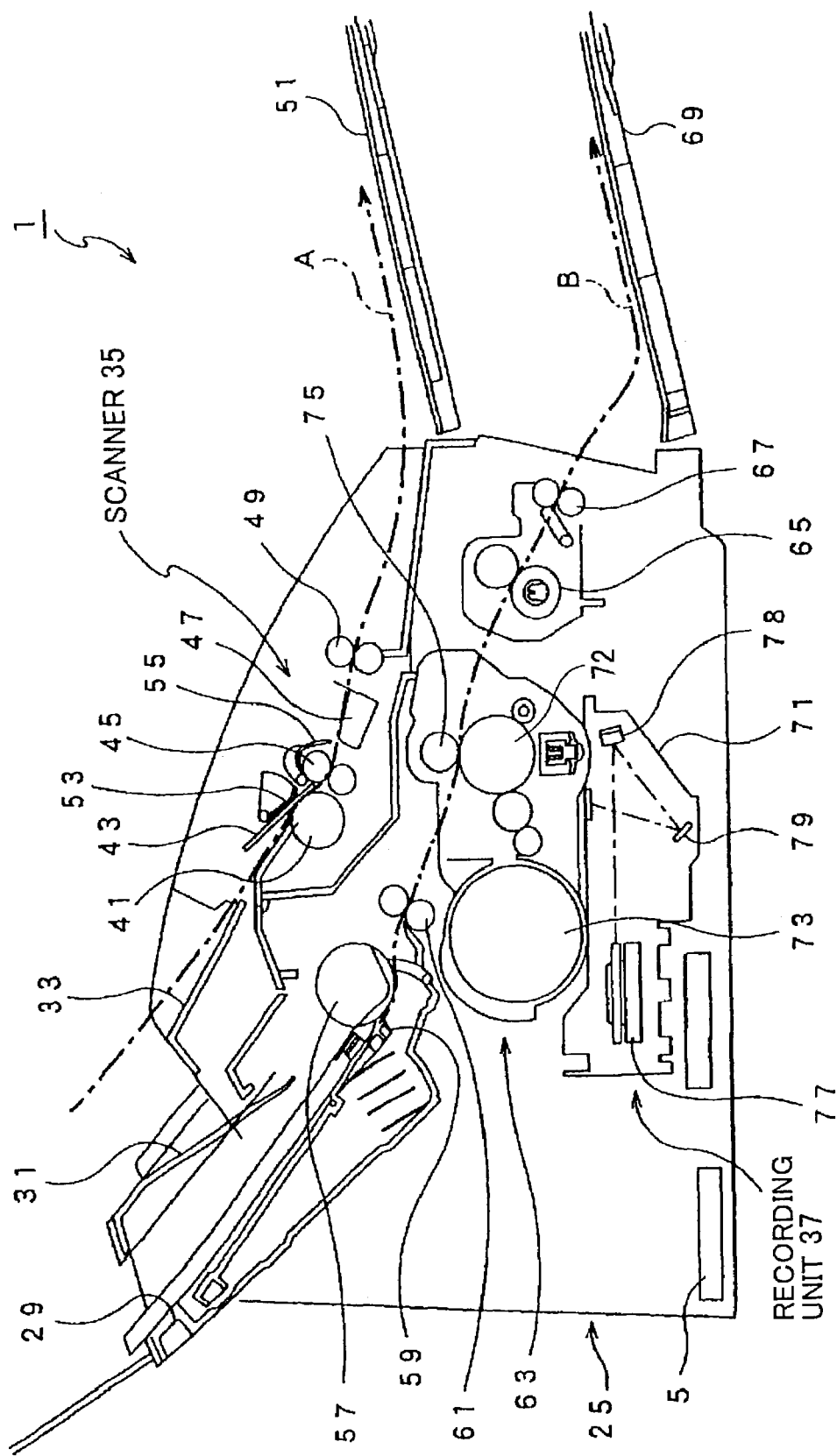
FIG. 3 is an explanatory diagram showing the internal construction of the facsimile device.

FIG. 1 is a block diagram illustrating an example of using a facsimile device 1 applying the present invention. FIG. 2 is a perspective view showing the overall external configuration of the facsimile device 1. FIG. 3 is a side cross-sectional view showing the internal construction of the facsimile device 1.

As shown in FIG. 1, the facsimile device 1 includes a circuit controller 3 and a communication module 5. The circuit controller 3 is provided with an external connection port 4. An analog line L1 (a telephone line formed of either two or four leads) connects between the external connection port 4 and a telephone connection port on a splitter 8 provided in a home office or other building.

The communication module 5 is provided with a WAN connection port 6 and a LAN connection port 7. The WAN connection port 6 is connected to an ADSL modem 9 via a LAN cable L3. The LAN connection port 7 is connected to a hub 11. The ADSL modem 9 is connected to an ADSL modem connection port in the splitter 8 via a LAN cable L2. As is well known in the art, the ADSL modem 9 is a signal converter that uses a common telephone line commonly provided in households for connecting the communication module 5 to a DSL (digital subscriber line) service center capable of accessing the Internet in order to perform bi-directional communications with the service center.

LAN terminals 13 through 17 are connected to the hub 11. The LAN terminals include a plurality of personal computers 13 and 14 capable of performing bi-directional communications, a printer 16, such as an inkjet printer or laser printer capable of connecting to a network, an IP telephone 15 capable of transmitting voice signals by Internet Protocol, and an Internet facsimile device 17 capable of connecting to the Internet. In other words, the hub 11 is connected to a local area network (LAN) provided in a building and configured of the above-described LAN terminals 13 through 17.

The splitter 8 is a device used for ADSL well known in the art. The splitter 8 is configured to receive a transmission signal from a splitter 19 provided on the base station end. The transmission signal includes a first signal of about 4 kHz or less superimposed on a second signal of a higher frequency for ADSL. The splitter 8 separates the first and second signals and outputs the first signal to the telephone connection port and the second signal to the ADSL modem connection port. The splitter 8 also superimposes signals received via these connection ports and transmits the superimposed signal to the splitter 19 on the base station end.

That is, the facsimile device 1 of the present embodiment can connect to a subscriber telephone on a public communication network (that is, a public switching telephone network: PSTN) using the circuit controller 3. The facsimile device 1 can also connect to the Internet serving as a wide area network (WAN) via the communication module 5 and the ADSL modem 9.

Through operations of a router controller 101 (FIG. 4) provided in the communication module 5, the facsimile device 1 functions as a router for routing data (IP packets) that is transmitted and received between a communication device on the Internet (such as a web server 21) and the LAN terminals 13 through 17 on the LAN.

The facsimile device 1 of the present embodiment has a facsimile function, a printer function, and a copy function. The facsimile function optically scans images from an original document, converts image data representing the scanned image into facsimile data, and transmits the facsimile data via the analog line L1 to an external facsimile device 23 connected to the public communication network. The facsimile function also receives facsimile data transmitted from the external facsimile device 23 via the public communication network and the analog line L1, and forms images on a recording paper based on the facsimile data.

The printer function is a function for forming images on recording paper based on image data (hereinafter referred to as "print data") transmitted from a word processor or the personal computer 13 or 14. When the facsimile device 1 receives print data from an external personal computer via a PC interface 24 (see FIG. 4) or from the personal computer 13 or 14 on the LAN via the communication module 5, the facsimile device 1 forms images based on the print data on recording paper. The copy function is a photocopying function for scanning images from an original document using a scanner 35 described later and for forming images on recording paper based on the image data using a recording unit 37.

As shown in FIG. 2, the facsimile device 1 having the functions described above includes an outer case 25, a handset 26 mounted on the side of the outer case 25, and an operating panel 27 provided on the front portion of the top surface of the outer case 25. The operating panel 27 is provided with various operating keys 270 including numeral keys 271 for inputting the telephone number (fax number) of other parties, a start key 272, and a select key 273, and a liquid crystal display (LCD) 274 for displaying data related to the various functions.

In addition, a first paper tray 29 for accommodating recording paper to be fed into the device is provided on the top back portion of the outer case 25. A second paper tray 31 is provided above the first paper tray 29 to enable the user to feed recording paper by hand. An original document feed tray 33 is provided above the second paper tray 31 for accommodating original documents to be scanned.

As shown in FIG. 3, the outer case 25 accommodates the scanner 35 for scanning images from an original document, the recording unit 37 for forming multicolor images on recording paper, and a circuit board (not shown) on which a CPU 39 (FIG. 4) is mounted for controlling the scanner 35 and the recording unit 37.

In the scanner 35, a document sensor (not shown) detects an original document placed in the original document feed tray 33. A feed mechanism including a feed roller 41, a separating pad 43, and the like picks up the original document one sheet at a time and feeds the document in a direction of an arrow A in FIG. 3. A conveying roller 45 conveys the original document to a scanning unit 47, which scans the images formed on the original document. After being scanned by the scanning unit 47, the original document is discharged by a discharge roller 49 onto a first discharge tray 51 provided on the front of the outer case 25.

In addition to the document sensor described above, the scanner 35 is provided with a leading edge sensor 53 for detecting the leading edge of the document and a trailing edge sensor 55 for detecting the trailing edge of the document. The CPU 39 regulates the document feeding process by controlling each unit in the scanner 35 based on detection results from these sensors 53, 55 in order to execute the operations of the scanner 35.

In the recording unit 37, a feed mechanism including a feed roller 57, a separating pad 59, and the like picks up recording paper loaded in either the first paper tray 29 or the second paper tray 31 one sheet at a time, and feeds the recording paper in a direction of an arrow B in FIG. 3. A conveying roller 61 conveys the sheet of recording paper to an image forming device 63. The image forming device 63 forms multicolor images on the recording paper by using toner of a plurality of colors (in the present embodiment, cyan, magenta, yellow, and black). After passing the image forming device 63, the recording paper is conveyed downstream to a fixing device 65. The fixing device 65 fixes the toner image on the recording paper. After further passing through the fixing device 65, the recording paper is discharged by a discharge roller 67 onto a second discharge tray 69 provided on the front of the outer case 25.

The image forming device 63 operates a laser scanning device 71 to irradiate laser light on a photosensitive drum 72 and form electrostatic latent images on the surface thereof. The laser scanning device 71 includes a laser emitting unit 77 for emitting laser light based on image data according to commands from the CPU 39, a lens 78 for reflecting laser light, a reflecting mirror 79 for guiding light reflected by the lens 78 onto the photosensitive drum 72, and the like. The image forming device 63 further includes a toner tank 73 storing toner. After an electrostatic latent image is formed on the photosensitive drum 72, toner from the toner tank 73 is selectively deposited on the photosensitive drum 72. A transfer roller 75 applies an electrical charge to the recording paper in order to transfer the toner from the photosensitive drum 72 onto the recording paper. Note that the diagram of the image forming device 63 shown in FIG. 3 is a conceptual drawing for describing the functions of the image forming device 63. That is, the image forming device 63 is configured of an image forming device well known in the art for forming color toner images. A toner image for each color is formed as described above, and the toner images are superimposed on one another to form a multicolor image.

Next, the electrical configuration of the facsimile device 1 will be described.

Figure 4:
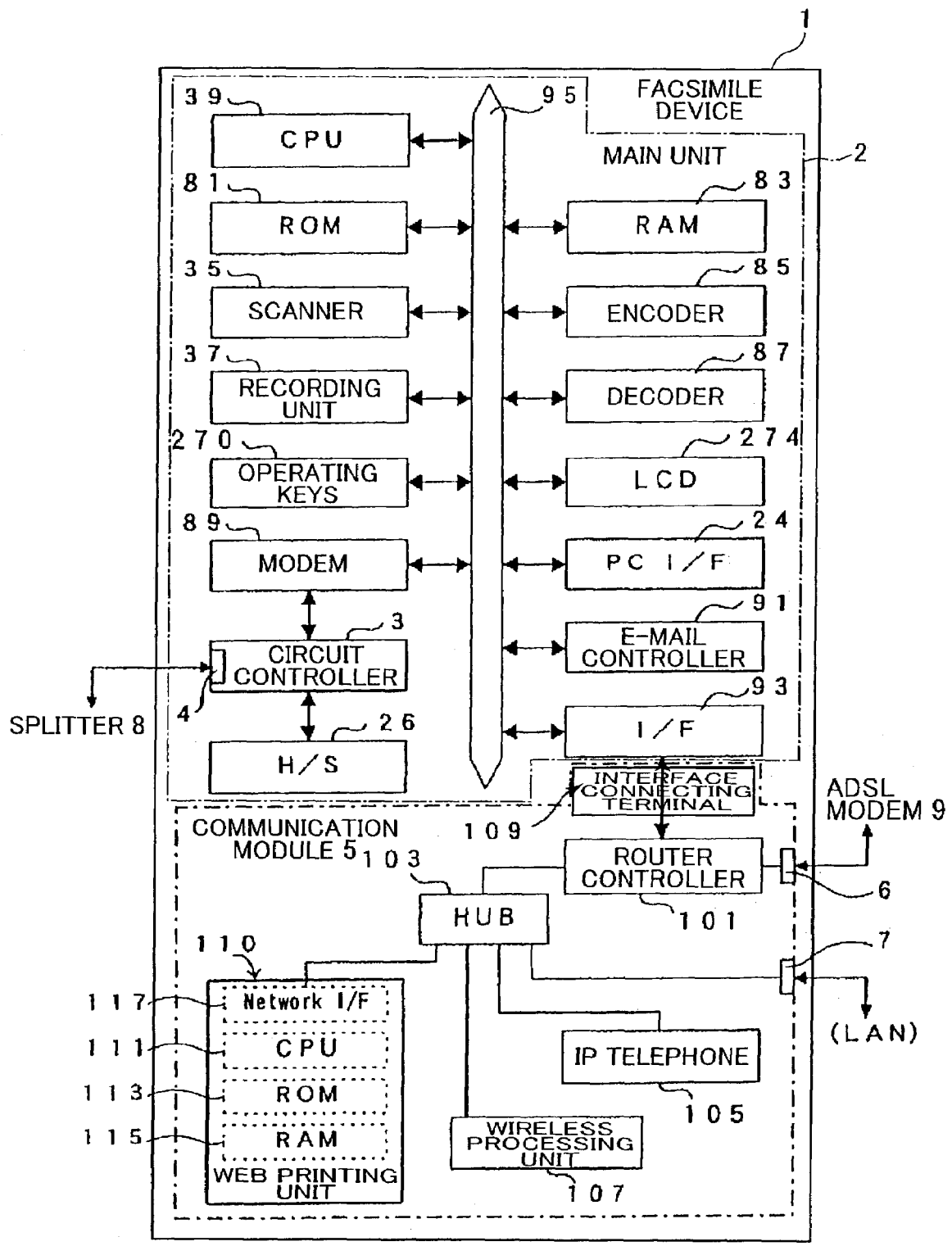
FIG. 4 is a block diagram showing the electrical configuration of the facsimile device.

As shown in FIG. 4, the facsimile device 1 primarily includes the CPU 39, a read only memory (ROM) 81, a random access memory (RAM) 83, the scanner 35, an encoder 85, the recording unit 37, a decoder 87, the operating keys 270, the LCD 274, a modem 89, the circuit controller 3, the PC interface 24, an e-mail controller 91, and a function expansion interface 93. All of these components are connected via a bus 95, and defining a main unit 2. The communication module 5 is connected to the function expansion interface 93.

The CPU 39 serves as the control center of the facsimile device 1 by performing overall control of the facsimile device 1. For example, the CPU 39 reads programs for control processes that are prestored in the ROM 81 and executes processes, such as transmission and reception of facsimile data and as address entry, according to these programs.

As shown in FIG. 5(b), the ROM 81 stores a facsimile function program group 81a, a printer function program group 81b, a recording unit control program 81c, various other programs not shown in the drawing, and various data required when executing these programs.

The facsimile function program group 81a is for operating the facsimile device 1 as a facsimile device. For example, the facsimile function program group 81a includes a reception program for forming images with the recording unit 37 based on facsimile data that the circuit controller 3 receives from the external facsimile device 23.

The printer function program group 81b is for operating the facsimile device 1 as a printer. The recording unit control program 81c is called by the above programs and the like.

As shown in FIG. 5(a), the RAM 83 functions as a work memory 83a that is necessary for performing various control processes, a transmission/received data storing unit 83b for storing facsimile data and the like, and a destination data storage unit 83c for storing destination data related to the transmission destination of the facsimile data.

As shown in FIG. 5(c), the destination data storage unit 83c can store telephone numbers as destination data for the transmission destination of facsimile data and can also store e-mail addresses in association with these telephone numbers. That is, the facsimile device 1 is capable of storing both a telephone number and e-mail address for each destination in case of when another device (external facsimile device 23) is not only capable of transmitting and receiving facsimile data via a public communication network, but also is capable of transmitting and receiving e-mail via the Internet.

The scanner 35 functions to scan an original document when copying or transmitting facsimile data or the like. As described above, the scanner 35 of the present embodiment is configured to pick up the original document from the original document feed tray 33, scan the images with the scanning unit 47, and output image data to the encoder 85 and the like as scanning results.

The encoder 85 executes an encoding process for converting image data scanned by the scanner 35 into G3 compressed image data in a facsimile format, and outputs the converted image data. The decoder 87 decodes image data in the facsimile format for converting into image data that can be processed by the recording unit 37.

As described above, the recording unit 37 functions as a color laser printer capable of forming color images. The recording unit 37 uses the image forming device 63 to print color images based on image data decoded by the decoder 87 and print data received from a web printing unit 110 (described later) according to instructions from the CPU 39 executing the recording unit control program 81c, and discharges the recording paper after the printing process.

The recording unit 37 is provided with a normal print mode and a quiet print mode capable of printing images with less noise than the normal print mode. The recording unit 37 switches between these modes according to instructions from the CPU 39. The recording unit 37 is also capable of performing monochrome printing and can form images using only a specified color of toner according to instruction from the CPU 39.

The operating keys 270 function to input instruction signals based on operations by the user in order to perform such operations as entering destination data and specifying a destination.

The LCD 274 functions as a display device for displaying various messages and the like, including error messages and messages for guiding the user steps of an operation. The LCD 274 of the present embodiment also functions as a touch panel. When the user is specifying a destination for facsimile data or entering destination data, the LCD 274 displays one-touch keys and acquires and inputs user-inputted data into the device.

The modem 89 functions to transmit and receive facsimile data to and from the external facsimile device 23 connected to the public communication network via the circuit controller 3 and the splitter 8. The circuit controller 3 functions to transmit dialing signals to the public communication network, to answer calling signals from the public communication network, and the like. For example, the circuit controller 3 connects to and can communicate with the external facsimile device 23 via the public communication network.

The PC interface 24 is employed when connecting a personal computer to the facsimile device 1 via a parallel interface or the like and functions to receive code data and the like from the personal computers 13 and 14. The e-mail controller 91 transmits and receives facsimile data via e-mail by transmitting and receiving e-mail between an external communication device connected to the Internet.

In other words, the e-mail controller 91 converts binary image data in a fax format, which was encoded by the encoder 85, into text-coded image data, and adds header data including the e-mail address for the transmission destination and the like to the converted image data. In this manner, the e-mail controller 91 converts the image data in a fax format into image data in an e-mail format that can be transmitted as e-mail. Similarly, the e-mail controller 91 converts image data in an e-mail format received via the Internet and the communication module 5 back to image data in a fax format. The image data converted back in a fax format in this manner is then decoded by the decoder 87 so that the recording unit 37 can output, and the recording unit 37 prints out the data on recording paper.

The function expansion interface 93 is a serial interface, such as AIO (Analog Input/Output) or RS232C. The separate communication module 5 including the router controller 101 can be detachably connected to the function expansion interface 93.

The communication module 5 includes the router controller 101, a hub 103, an IP telephone unit 105, a wireless processing unit 107, a web printing unit 110, an interface connecting terminal 109 connected to the router controller 101, and the like. The communication module 5 is connected to the function expansion interface 93 via the interface connecting terminal 109.

The router controller 101 is for transmitting and receiving IP packets between a communication device on the Internet via the ADSL modem 9, and functions as a broadband router well known in the art, having an IP masquerade function and a routing function. Using the IP masquerade function, the router controller 101 can convert both ways between a private IP address used on a LAN and a global IP address used on a WAN (the Internet in the present embodiment). Using the routing function, the router controller 101 can connect a terminal on the LAN end to a communication device on the WAN end (the web server 21) to perform bi-directional communications.

For example, by transmitting and receiving data with the IP telephone unit 105, the wireless processing unit 107, and the web printing unit 110 via the hub 103, the router controller 101 can connect the IP telephone unit 105, the wireless processing unit 107, and the web printing unit 110 to the Internet via the ADSL modem 9 for performing bi-directional communications.

Further, by communicating with the LAN terminals 13 through 17 on the LAN connected to the LAN connection port 7 via the hub 103, the router controller 101 can connect the LAN terminals 13 through 17 to the Internet for performing bi-directional communications. In other words, the router controller 101 controls communication routes and transmits data received from the web server 21 to the destination LAN terminals 13 through 17 for example.

In addition, the router controller 101 can communicate with the CPU 39 of the main unit 2 via the function expansion interface 93. In other words, the LAN terminals 13 through 17, the IP telephone unit 105, the wireless processing unit 107, and the web printing unit 110 can communicate bi-directionally with the CPU 39 of the main unit 2 via the router controller 101 and the function expansion interface 93. For example, if the CPU 39 receives print data from the web printing unit 110 via the router controller 101, then the CPU 39 executes the printer function program, calls the recording unit control program 81c within this program, and controls the recording unit 37 to form images based on the data.

The IP telephone unit 105 connected to the router controller 101 via the hub 103 is configured to store voice signals in IP packets and execute voice communications (a call) with an external IP telephone via the Internet.

The wireless processing unit 107 functions to perform wireless communications between an external wireless communication device and the facsimile device 1. The wireless processing unit 107 can connect an external wireless communication device to the components in the facsimile device 1 for performing bi-directional communications using a wireless connecting method that conforms with the Bluetooth standard (close-range wireless communication standard) or the IrDA standard (infrared communication standard). For example, the LAN terminals 13 through 17 can each be connected to the facsimile device 1 by a wired connecting method using the LAN connection port 7 connected to the hub 103. In addition, the LAN terminals 13 through 17 can be connected to the facsimile device 1 by a wireless connecting method using the wireless processing unit 107.

The web printing unit 110 includes a CPU 111, a ROM 113, a RAM 115, a network interface 117, and the like. The web printing unit 110 can connect itself to the Internet or communicate with the CPU 39 of the main unit 2 by communicating with the router controller 101 via the network interface 117.

FIG. 6(a) is an explanatory diagram showing the data structure in the RAM 115 of the web printing unit 110. As shown in FIG. 6 (a), the RAM 115 functions as a work memory 115a, a transmission/received data storage unit 115b, a URL data storage unit 115c, a transfer destination data storage unit 115d, and an access prohibited database 115e. The transmission/received data storage unit 115b is for storing data received from an external source, such as the web server 21, the personal computers 13 and 14, or the like, and data to be transmitted to an external device. The URL data storage unit 115c is for storing URL (Uniform Resource Locator) data indicating the address of the web server 21. The transfer destination data storage unit 115d is for storing transfer destination data regarding transfer destinations. The access prohibited database 115e is for storing URL data of a destination to which access is prohibited.

FIG. 6(b) is an explanatory diagram showing the data structure in the ROM 113. As shown in FIG. 6(c), the URL data storage unit 115c can store a plurality of entries of memo data and scheduler setting data in association with corresponding URLs. As is well known in the art, a URL is address data configured of a server address, directory data, filename, and the like.

The memo data allows the user to quickly determine a desired URL, since it is difficult to determine what website to access only from the URL display and, moreover, it is not easy to search for a desired URL because the display area of the LCD 274 is limited. The communication module 5 stores memo data, which the user inputs externally through operations on the operating panel 27 and the like, in association with corresponding URLs into the URL data storage unit 115c.

The scheduler setting data is provided for acquiring data from a web server periodically. In order to acquire data from a web server periodically, the web printing unit 110 executes the program for a second URL inputting process (FIG. 8) in the web printing function program group 113a stored in the ROM 113.

In addition to the program for the second URL inputting process, the web printing function program group 113a also includes a program for a first URL inputting process (FIG. 7) and a program for a third URL inputting process (FIG. 9) described later. The CPU 111 in the web printing unit 110 executes these programs to acquire data from an external web server.

The web printing unit 110 in the present embodiment has a function for controlling the recording unit 37 to print images individually based on data received from the web server 21 and the personal computers 13 and 14 via the router controller 101; a function to control the recording unit 37 to print images based on data received from the web server 21 and the personal computers 13 and 14 collectively; and the like. The web printing unit 110 executes these functions using the web printing function program group 113a. The RAM 115 is controlled to function as a print control data storing unit 115i in order that the web printing unit 110 can control the recording unit 37 to print images based on received data collectively. A more detailed description of these functions will be provided later.

In addition the above functions, the web printing unit 110 further includes a printer transferring function for transferring data acquired from the web server 21 via the router controller 101 to the printer 16 at the transmission destination (a printer identified by address data for a printer transfer destination stored in the transfer destination data storage unit 115d) connected to a LAN via the LAN connection port 7; a personal computer transferring function for transferring data acquired from the web server 21 to the personal computers 13 and 14 connected to the LAN via the LAN connection port 7; a monochrome printing function for instructing the recording unit 37 to print monochrome images based on received data; a quiet printing function for operating the recording unit 37 to print images based on the received data in the quiet print mode for suppressing noise during the printing process; a log saving function for saving log data for various processes executed by the web printing unit 110; and the like. These functions are implemented by the web printing function program group 113a. The functions can be toggled ON and OFF based on various settings.

Next, various processes executed by the CPU 111 in the web printing unit 110 for acquiring data from a web server will be described with reference to FIGS. 7 through 11.

Figure 7:
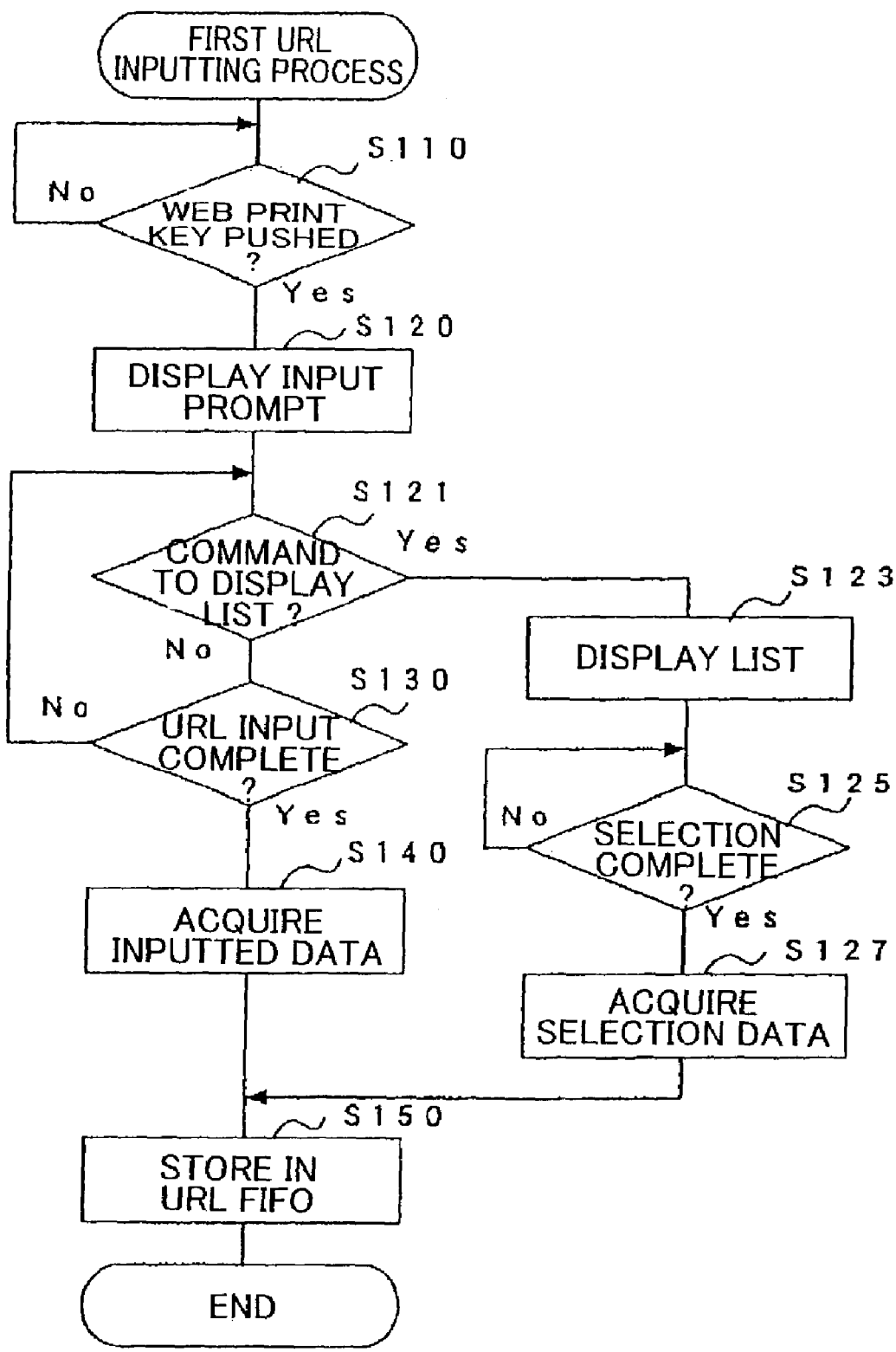
FIG. 7 is a flowchart representing a first URL inputting process according to the present embodiment.
Figure 8:
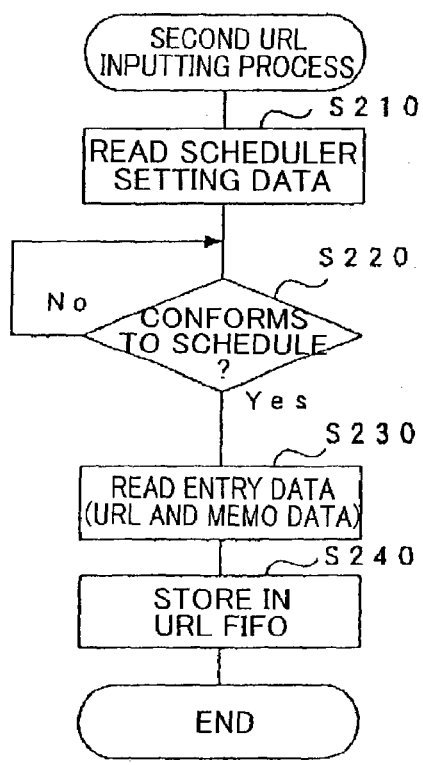
FIG. 8 is a flowchart representing a second URL inputting process according to the present embodiment.

Immediately after the facsimile device 1 is powered ON, the CPU 111 executes the first URL inputting process (FIG. 7), a second URL inputting process (FIG. 8), and a third URL inputting process (FIG. 8). FIG. 7 is a flowchart showing the first URL inputting process repeatedly executed by the CPU 111.

As shown in FIG. 7, when the first URL inputting process starts, first in S110, the CPU 111 determines whether or not a web print key (not shown) provided on the operating panel 27 has been pressed based on instruction signals transmitted from the operating panel 27. If not (S110:NO), the process waits until the web print key is pressed. If so (S110:YES), then in S120, the web printing unit 110 displays an input prompt on the LCD 274 provided on the operating panel 27. The input prompt enables a user to input a desired URL.

Subsequently, in S121, the CPU 111 determines whether or not an instruction signal to display a URL list was received from the operating panel 27. If not (S121:NO), then in S130, the CPU 111 determines whether or not an input complete signal indicating the user has completed inputting a URL character string was received from the operating panel 27. Here, both the instruction signal and the input complete signal from the operating panel 27 are received via the function expansion interface 93, the router controller 101, the hub 103, and the network interface 117.

If the input complete signal was received in S130 (S130: YES), this means that a URL has been completely inputted at the input prompt, then in S140, data representing the URL inputted by the user is acquired from the main unit 2. Then, the process proceeds to S150, where the data (URL) is stored in the URL FIFO.

The URL FIFO is a FIFO (first in first out) storage unit storing entries of URLs and used to access the web server 21 at each URL in order of entry to acquire data on the web server 21. The URL FIFO is provided in the work memory 115a and stores URLs in association with corresponding memo data. After the URL and memo data have been entered into the URL FIFO, the CPU 111 ends the first URL inputting process.

On the other hand, if the CPU 111 determines in S121 that the instruction signal for displaying a URL list was received (S121:YES), then in S123, the CPU 111 retrieves the URL and memo data from the URL data storage unit 115c, and displays a list of this URL and memo data on the LCD 274. This list is displayed approximately in the format shown in FIG. 6(c).

Next in S125, the CPU 111 determines whether or not a selection complete signal was received from the operating panel 27. The selection complete signal indicates that a URL was selected from the list. If not (S125:NO), then the process waits until the selection complete signal is received. If so (S125:YES), then in S127, the CPU 111 extracts selection data relating to the selected URL from the operating panel 27. The process proceeds to S150, where the CPU 111 stores the selected URL and memo data in the URL FIFO, and then the first URL inputting process ends.

Next, the second URL inputting process will be described with reference to the flowchart of FIG. 8. When the second URL inputting process starts, first in S210, the CPU 111 retrieves scheduler setting data from the URL data storage unit 115c. Next in S220, the CPU 111 determines whether or not the scheduler setting data conforms to the current date and time.

For example, scheduler setting data stored in association with the topmost URL in FIG. 6(c) indicates that data is to be obtained from the web server 21 on the 15$^{th}$ of each month. Hence, if the CPU 111 compares the scheduler setting data (data representing the date) with the current date and time, and determines that the two match, then the CPU 111 determines that there is a URL conforming to the data acquisition schedule (S220:YES).

Similarly, scheduler setting data stored in association with the URL of the second entry in FIG. 6(c) indicates that data is to be acquired from the web server 21 on Thursday of each week. If the CPU 111 compares this scheduler setting data (data indicating the day of the week) with the current date and time (the current day of the week), and determines the two days of the week match, then the CPU 111 determines that there is a URL conforming to the data acquisition schedule (S220:YES).

Further, settings data stored in association with the URL of the third entry in FIG. 6(c) indicates that data is to be acquired from the web server 21 everyday at 10:00. In S220, the CPU 111 compares the scheduler setting data to the current date and time. If the two times match, then the CPU 111 determines that there is a URL conforming to the data acquisition schedule (S220:YES).

In the process described above, the CPU 111 compares all scheduler setting data stored in the URL data storage unit 115c to the current date and time.

If the CPU 111 determines in S220 that a URL matches the current date and time in the above-described manner (S220:YES), then the process proceeds to S230. On the other hand, if there is no URL that matches the current date and time (S220:NO), then the operation of S220 is repeatedly executed until a URL conforming to the current date and time appears.

In S230, the URL is retrieved from the URL data storage unit 115c, and in S240, the URL and memo data are stored in the URL FIFO. Then, the present process ends. After ending the process, the CPU 111 again executes the second URL inputting process.

Figure 9:
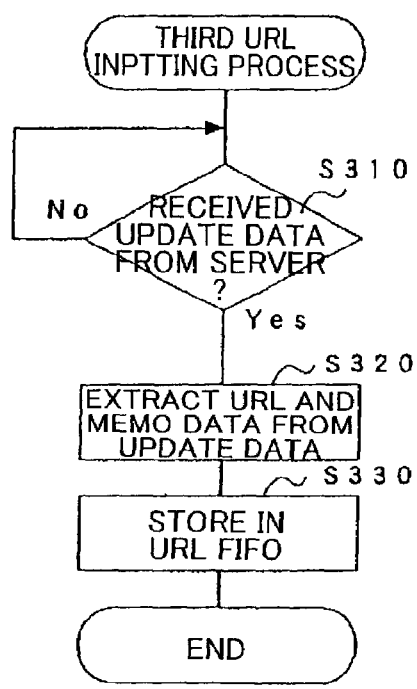
FIG. 9 is a flowchart representing a third URL inputting process according to the present embodiment.

Next, the third URL inputting process will be described with reference to the flowchart of FIG. 9.

When the third URL inputting process starts, first in S310, the CPU 111 determines whether or not update data for the web server 21 is received from an external administrative server via the router controller 101. This process assumes that a server exists for managing update data for the web server 21. By pre-recording settings of a URL for which provision of update data is desired on the administrative server, update data will be transferred from the administrative server each time data on the web server 21 corresponding to that URL is updated.

If the CPU 111 determines that update data has been received (S310:YES), then the process proceeds to S320. On the other hand, if not (S310:NO), then the process waits until a positive determination is made in S310. In S320, the CPU 111 extracts the URL and memo data for the web server 21 from the received update data, and in S330, the CPU 111 stores the URL and memo data extracted from the update data into the URL FIFO. Then, the present process ends. As with the first and second URL inputting processes described above, after ending the third URL inputting process, the CPU 111 again executes the third URL inputting process.

Figure 10:
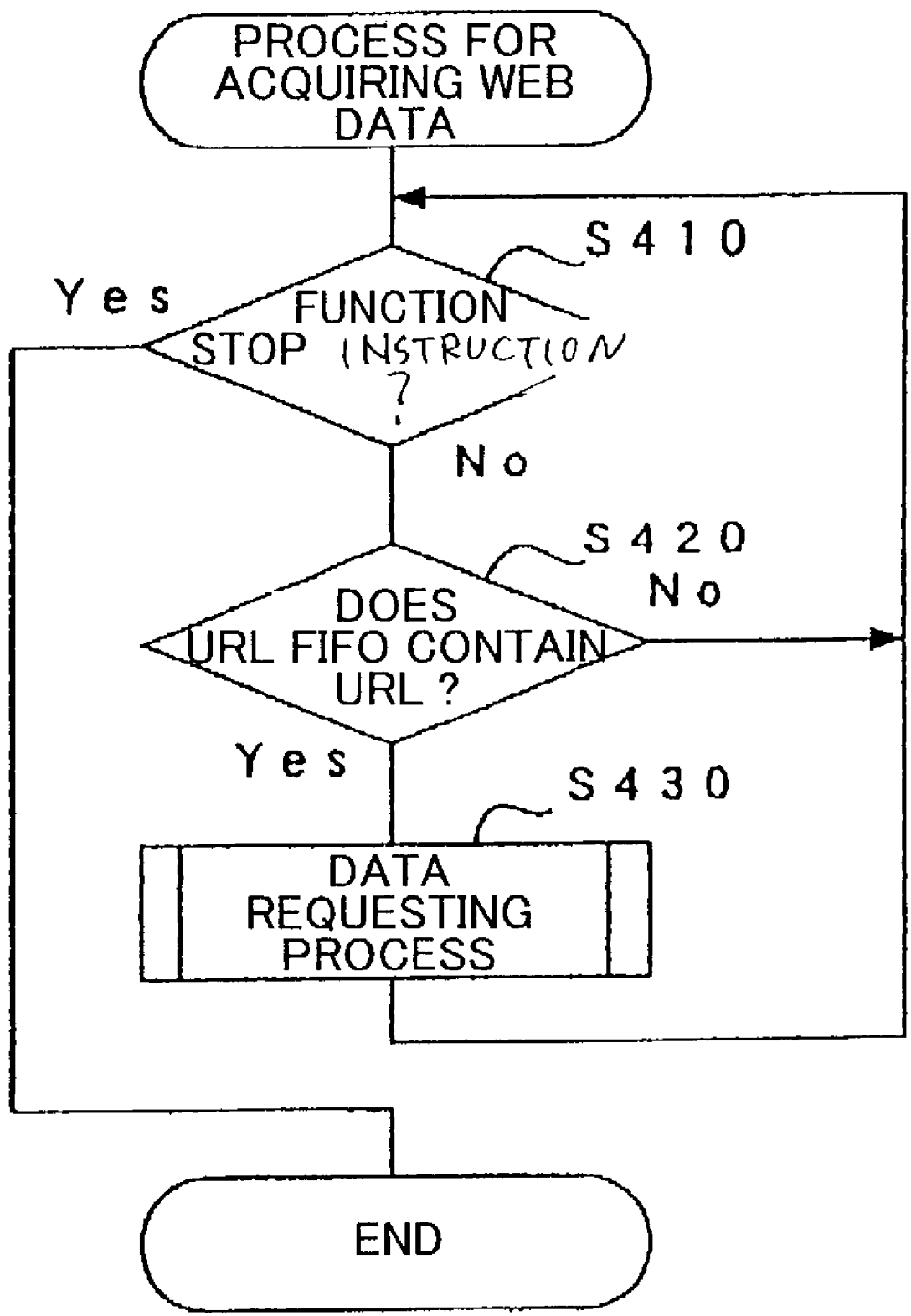
FIG. 10 is a flowchart representing a process for acquiring web data according to the present embodiment.

Next, a web data receiving process will be described with reference to the flowchart of FIG. 10. The web data receiving process of FIG. 10 is executed by the CPU 111 after the power is turned ON.

When the web data outputting process starts, first in S410, the CPU 111 determines whether or not a web printing function stop instruction has been input. Here, the web printing function stop instruction indicates to stop the web printing function and can be input by a user pressing a web printing function stop key provided on the operating panel 27. If so (S410:YES), then the present process ends. On the other hand, if not (S410:NO), then the CPU 111 determines in S420 whether or not a URL is being stored in the URL FIFO.

If not (S420:NO), then the process returns to S410. If so (S420:YES), then the CPU 111 executes a data requesting process in S430, and the process returns to S410.

The data requesting process executed in S430 will be described with reference to the flowchart of FIG. 11.

Figure 11:
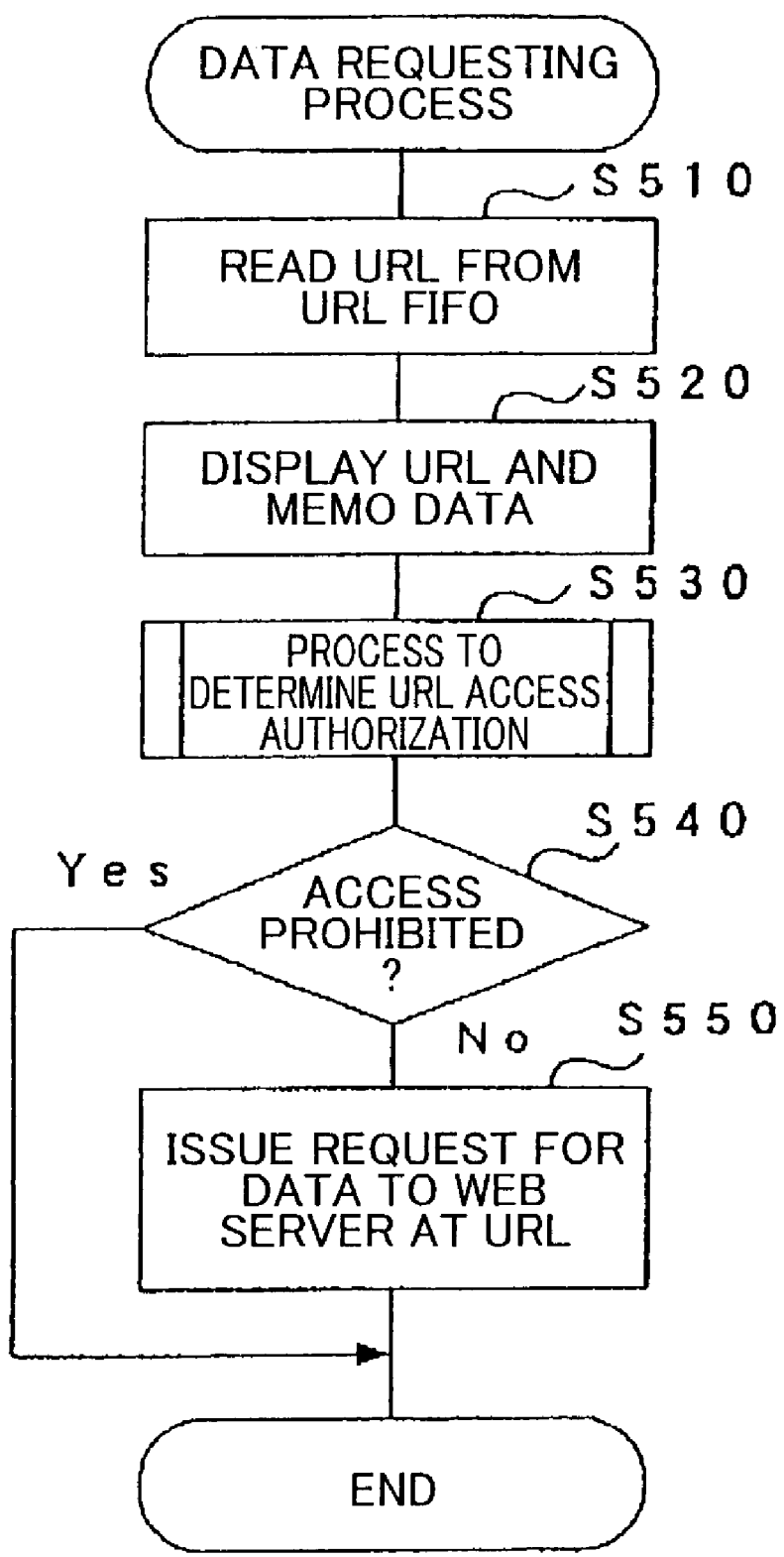
FIG. 11 is a flowchart representing of a data requesting process according to the present embodiment.

As shown in FIG. 11, when the data requesting process starts, first in S510, the CPU 111 reads the URL and memo data from the URL FIFO. Next in S520, the CPU 111 displays the URL and memo data on the LCD 274 by transmitting this data to the main unit 2 via the function expansion interface 93. Subsequently, the CPU 111 executes in S530 a process to determine URL access authorization.

In the process to determine URL access authorization, the CPU 111 checks the URL read from the URL FIFO against URLs stored in the access prohibited database 115e. The access prohibited database 115e stores URLs for the web server 21 for which access has been prohibited. If the URL read from the URL FIFO matches one of the URLs stored in the access prohibited database 115e, then this means that accessing the web server 21 at the URL is prohibited. The URL check performed in the process to determine URL access authorization can attempt to match all data in URLs or only a portion of the URLs, such as the server address, or can check the existence of an upper level directory keyword.

Then, in S540, the CPU 111 determines whether or not the access to the web server 21 at this URL is prohibited. If so (S540:YES), then the data requesting process ends. In this manner, it is possible to prevent the facsimile device 1 from acquiring and printing inappropriate data from the web server 21. On the other hand, if not (S540:NO), then in S550, the CPU 111 requests the web server 21 to transmit data by transmitting a request signal (for example, a "get" command in HTTP) via the Internet to the web server 21 at the URL. Subsequently, the data requesting process ends.

Next, a print accepting process executed by the CPU 111 will be described while referring to the flowchart of FIG. 12. The print accepting process is executed immediately after the facsimile device 1 is powered ON.

When the print accepting process starts, first in S610, the CPU 111 determines whether or not a quit instruction has been received. The quit instruction is inputted through such operations as turning OFF the facsimile device 1. If S610 results in a positive determination (S610:YES), then the print accepting process ends. If S610 results in a negative determination (S610:NO), then in S620, the CPU 111 determines whether or not the network interface 117 has received data for printing, such as HTML data or PDL data, from an external web server 21 or the personal computers 13 and 14 on the LAN via a network, such as the Internet or the LAN, and the router controller 101.

Figure 13:
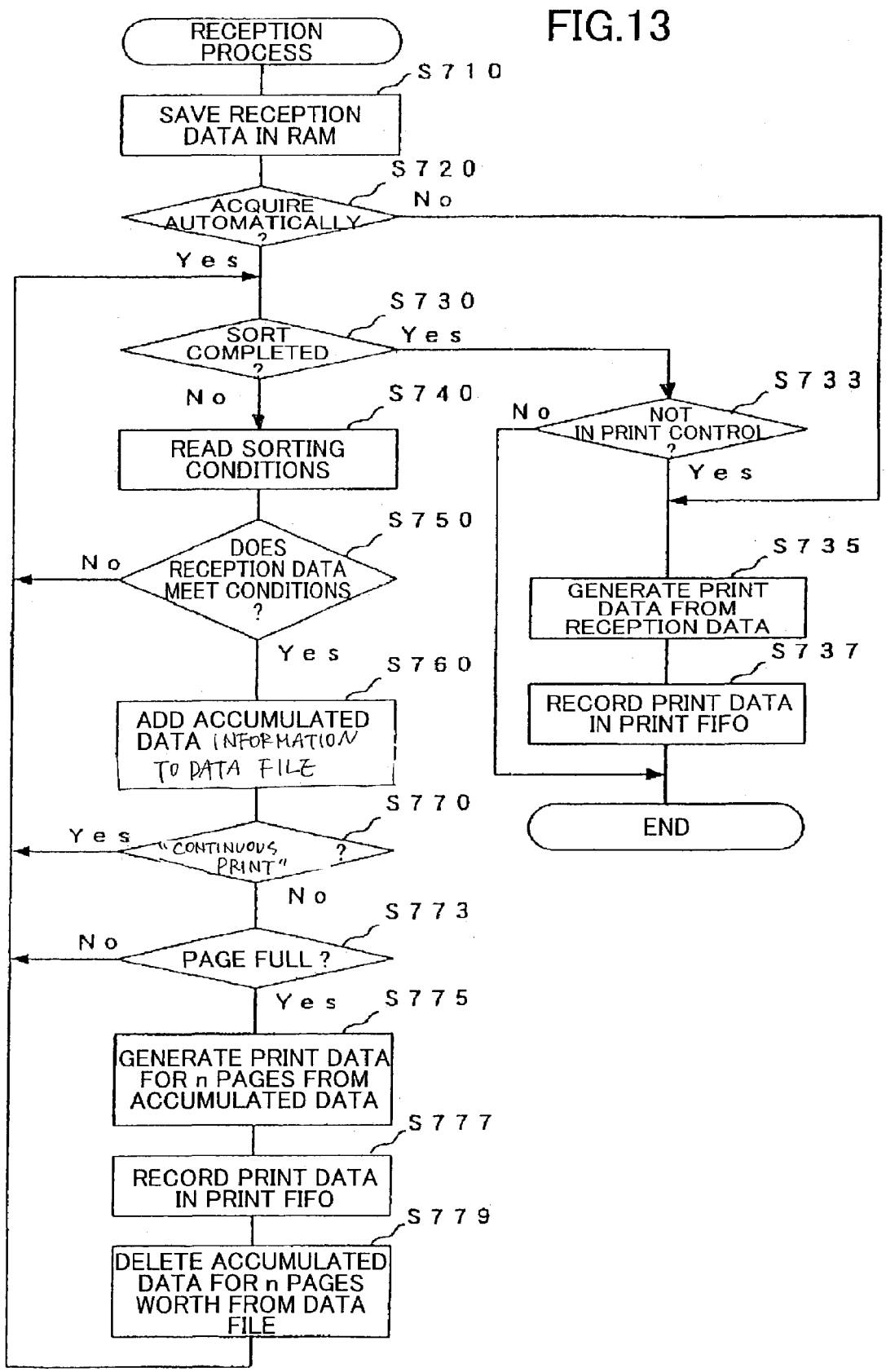
FIG. 13 is a flowchart representing of a reception process according to the present embodiment.

If it is determined in S620 that data for printing was received (S620:YES), then the CPU 111 executes a reception process in S625. FIG. 13 shows a flowchart representing the reception process executed in S625.

As shown in FIG. 13, when the reception process starts, first in S710, the CPU 111 stores the received data in the transmission/received data storage unit 115b by appending the received data to data already stored therein. Next in S720, the CPU 111 determines whether or not the received data is a type that is automatically acquired from the web server 21. In other words, the CPU 111 determines whether the data was automatically transferred from the web server 21 through the operations of the second and third URL inputting processes that record URLs in the URL FIFO, without waiting for instruction signals from the user. If the CPU 111 determines in S720 that the received data is not this type (S720:NO), this means that the received data is of a type transmitted from the personal computer 13 or 14 or transmitted through the operations of the first URL inputting process. Then in S735, the CPU 111 generates print data from the received data that can be printed by the recording unit 37. For example, when the received data is in an HTML format, then the data is converted to image data that can be used in a printing process. When the received data is in a PDL format, then the received data is used in its present form as print data.

In S737, the CPU 111 enters the print data in a print FIFO and the reception process ends. The print FIFO is for processing print data in the order entered and directs the recording unit 37 to form images based on this print data. The print FIFO is provided in the work memory 115a.

On the other hand, if the CPU 111 determines in S720 that the received data is of a type that is acquired automatically (S720:YES), then in S730, the CPU 111 references a print control table T stored in the print control data storing unit 115i to determine whether or not the received data has been sorted according to sorting conditions.

FIG. 14 is an explanatory diagram showing the configuration of the print control table T stored in the print control data storing unit 115i. The web printing unit 110 of the present embodiment has a function for sorting the received data into classes stipulated by printing conditions R described later, for directing the recording unit 37 to print the stored data collectively. The print control table T stores a plurality of print conditions R. Each printing condition R includes data indicating a control number, sorting conditions, a filename, an operating mode, a print endpoint, and a consecutive flag.

The sorting conditions are used for storing received data. The filename indicates a filename of a data file where accumulated data information is stored. The accumulated data information indicates a save location and the like of received data. In the present embodiment, the web printing unit 110 includes a "normal accumulating print" mode and a "continuous print" mode as the operating mode. The print endpoint is a line number representing a position on the recording paper at which previous printing has stopped. The consecutive flag is for toggling between enabling and disabling a consecutive print function, and is initialized to OFF. The consecutive print function is for printing images starting from an endpoint on a recording paper of the previous printing.

In S730, the CPU 111 determines whether or not the received data has been checked against all the printing conditions R in the print control table T. If not (S730:NO), then in S740, the CPU 111 reads sorting condition of one printing condition R that has not been checked. In S750, the CPU 111 determines whether or not the received data matches the sorting conditions.

For example, when the CPU 111 reads in S740 the sorting conditions for the control number 1, then in S750, the CPU 111 determines whether or not the received data is data received from "○○.com." If so (S750:YES), then in S760, the CPU 111 categorizes the received data to the class of the control number 1, by writing accumulated data information into the corresponding data file. The accumulated data information indicates the save location and the like of the received data in the RAM 115. In this example, the accumulated data information is appended to existing accumulated data information in the data file "○○.dat" set for the control number 1.

In S770, the CPU 111 determines whether the operating mode set for the control number (control number 1 in this example) is the "continuous print" mode. If so (S770:YES) then the process returns to S730. If not (S770:NO), then the CPU 111 executes processes for the "normal accumulating print" mode in S773 through S779.

For example, the operating mode for the control number 1 is the "normal accumulating print" mode in the print control table T of FIG. 14, a negative determination is made in S770 in this case (S770:NO), and the process proceeds to S773.

In S773, the CPU 111 determines whether or not the total amount of received data stored in the transmission/received data storage unit 115b and sorted for the control number 1 is equal to or greater that one page worth of data amount. If not (S773:NO), then the process returns to S730. On the other hand, if so (S773:YES), then in S1775, the CPU 111 reads received data from the transmission/received data storage unit 115b based on the accumulated data information, and combines the data to generate one print data. In S777, the CPU 111 records this print data in the print FIFO.

More specifically, in S775, the CPU 111 generates a single unit of print data by combining received data in page units (that is, n pages worth of data, where n is an integer). For example, when the total amount of received data is 3.5 pages worth, then in S775 the CPU 111 generates print data by combining only 3 pages worth of received data, while excluding the remaining 0.5 pages worth of received data from the process. Then, the print data is recorded in the print FIFO in S777.

Subsequently, in S779, the CPU 111 deletes the accumulated data information for the received data (n pages worth), which was used to generate the print data in S775, from the corresponding data file.

Then, the process returns to S730, where the CPU 111 determines whether or not sorting has been completed, by determining whether or not the received data has been checked against the sorting conditions of all of the print conditions R. If sorting is not completed (S730:NO), then in S740, the CPU 111 reads the sorting conditions for the next print condition R, and in S750, the CPU 111 determines whether or not the received data conforms to the sorting conditions.

In the present embodiment, a plurality of sorting conditions can be set for a single print condition R. When a plurality of conditions are set, then in S750 the CPU 111 determines whether the received data meets all sorting conditions.

For example, when determining in S750 whether the received data conforms to the sorting conditions of the control number 2 (FIG. 14), the CPU 111 determines whether the received data includes the label "newspaper heading" as data-type identification data, and also whether the transmission source of the received data is "□□.com." If both sorting conditions are satisfied, then the CPU 111 determines that the received data conforms to the sorting conditions of control number 2 (S750:YES).

When determining in S750 whether or not the received data conforms to the sorting conditions of the control number 3, the CPU 111 determines whether or not the transmission source of the received data is "ΔΔ.com." If the CPU 111 determines that the transmission source of the received data is "ΔΔ.com," then the CPU 111 determines "Yes" in S750. However, since the operating mode set for the control number 3 in FIG. 14 is the "continuous print" mode, the CPU 111 determines "Yes" in S770, and the process returns to S730 without executing the processes of S773 through S779, even if the received data conforms to the sorting conditions of the control number 3.

When a determination is executed in S750 for the sorting conditions of the control number 4, the CPU 111 determines "Yes" if the received data includes the label "log data". When a determination is executed in S750 for the sorting conditions of the control number 5, the CPU 111 determines "Yes" if the received data includes the label "Snapshot".

When data conforms to sorting conditions of more than one print condition R, the CPU 111 adds the accumulated data information of the received data into the data file corresponding to each of the print conditions R.

After the received data has been checked against sorting conditions corresponding to all control numbers, a positive determination is made in S730. Then in S733, the CPU 111 determines whether or not the received data is the target of print control (that is, if the received data conforms to the sorting conditions of any of the print conditions R). If the CPU 111 determines in S733 that the received data is not target of print control (S733:NO), then in S735, the CPU 111 generates print data from the received data. In S737, the CPU 111 records the print data in the print FIFO and ends the reception process.

On the other hand, if the received data conforms to the sorting condition of at least one print conditions R, then a positive determination is made in S733 (S733:YES). In this case, the process skips the processes of S735 and S737, and the reception process ends. After ending the reception process, the CPU 111 executes a print controlling process in S690 (FIG. 12).

Figure 15:
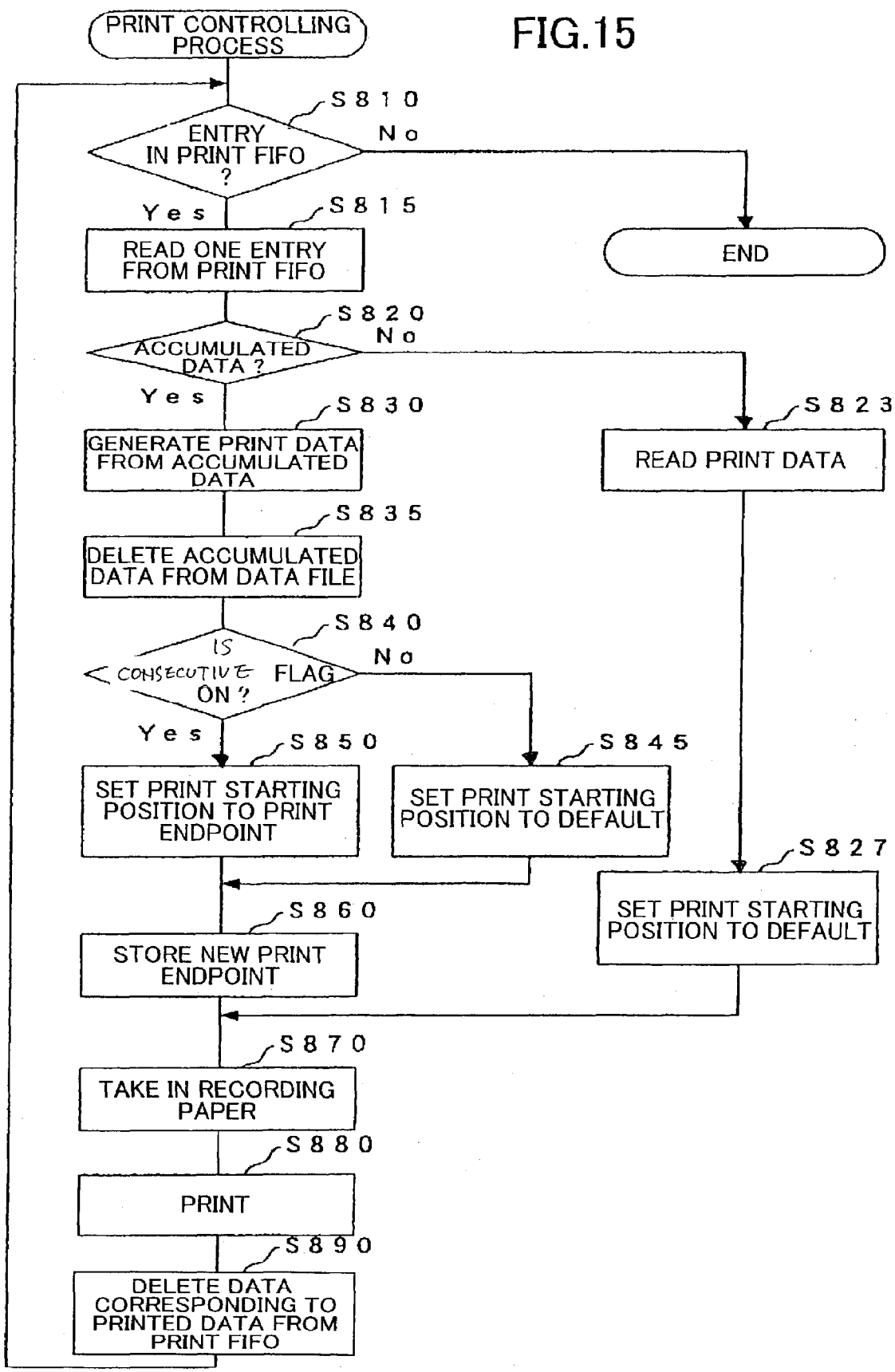
FIG. 15 is a flowchart representing of a print controlling process according to the present embodiment.

Here, the print controlling process executed by the CPU 111 in S690 will be described with reference to the flowchart of FIG. 15. As shown in FIG. 15, when the print controlling process starts, first in S810, the CPU 111 determines whether or not any entry is recorded in the print FIFO. If the print FIFO contains no entries (S810:NO), then the print controlling process ends. On the other hand, if entries exist in the print FIFO (S810:YES), then the CPU 111 reads one entry from the print FIFO in S815.

In S820, the CPU 111 determines whether or not the entry read in S815 is accumulated data information. If the entry read from the print FIFO was recorded in the print FIFO in S680 (FIG. 12), then the CPU 111 determines that the entry is accumulated data information (S820:YES). However, if the entry read from the print FIFO was recorded in the print FIFO in S737 or S777 (FIG. 13), then the CPU 111 determines that the entry is not accumulated data information (S820:NO).

If S820 results in a negative determination (S820:NO), then in S823, the CPU 111 reads print data stored in the RAM 115 based on the entry data. In S827, the CPU 111 sets the print starting position to a default position, which is a top position on the recording paper in this embodiment. In S870, the CPU 111 requests the CPU 39 on the main unit 2 to control the recording unit 37 to introduce recording paper therein. According to this request, the CPU 39 executes the recording unit control program 81c and the like, controlling the paper feed mechanism of the recording unit 37 to introduce recording paper therein.

In S880, the CPU 111 directs the CPU 39 to control the recording unit 37 by transferring print data to the CPU 39, so that the CPU 39 controls the recording unit 37 to print images based on the print data from the print start position, which is the top position of the recording paper in this case.

Next in S890, the CPU 111 deletes the entry in the print FIFO corresponding to the print data just printed. Subsequently, the process returns to S810. In S810, the CPU 111 again determines whether or not the print FIFO contains an entry. If no entry exists (S810:NO), then the CPU 111 ends the print controlling process. On the other hand, if an entry exists in the print FIFO (S810:YES), then in S815, the CPU 111 reads the next entry from the print FIFO, and determines in S820 whether or not the entry is accumulated data information.

If the CPU 111 determines in S820 that the entry is accumulated data information (S820:YES), then in S830, the CPU 111 deduces the save location of the received data from the accumulated data information, reads the received data from the save location, combines the received data, and generates a single unit of print data. For example, if the received data is in the HTML format, then the received data is converted to image data to generate print data.

After generating the print data, in S835, the CPU 111 deletes the accumulated data information corresponding to the received data converted to print data in S830 from the data file. In S840, the CPU 111 references the consecutive flag in the print control table T corresponding to the control number recorded in the print FIFO, and determines whether the consecutive flag corresponding to this control number is ON.

If the consecutive flag is OFF (S840:NO), then in S845, the CPU 111 sets the print starting position to the default position which is the top position of the recording paper. Since the consecutive flag is initialized to OFF as described above, the CPU 111 determines "No" in S840 unless the flag is set to ON in S645 of FIG. 12 to be described later.0

In S860, the CPU 111 writes a print endpoint in the print control table T as print endpoint associated with the control number corresponding to this print data. The print endpoint is the position on the recording paper at which the recording unit 37 will complete image formation based on this print data (the print completion position). The facsimile device 1 of the present embodiment is configured to write a line number representing the position on the recording paper at which printing stops as the print endpoint. Then, the process proceeds to S870. In this case, images are formed in S880 based on the print data beginning from the top position on the recording paper.

On the other hand, if the CPU 111 determines in S840 that the consecutive flag is ON (S840:YES), then in S850, the CPU 111 reads the corresponding print endpoint data from the print control table T. In S860, the CPU 111 sets the print starting position to the print endpoint read in S840. At this time, the print data is converted such that the recording unit 37 forms images based on the current print data beginning from the print starting position. In S860, the CPU 111 writes the print endpoint of the recording paper at which image formation based on the current print data will end into the print control table T as corresponding print endpoint. Then, the process proceeds to S870. In this case, images are formed in S880 based on the current print data beginning from the print starting position, which in this case is the endpoint of the recording paper at which previous printing operations were completed.

Figure 12:
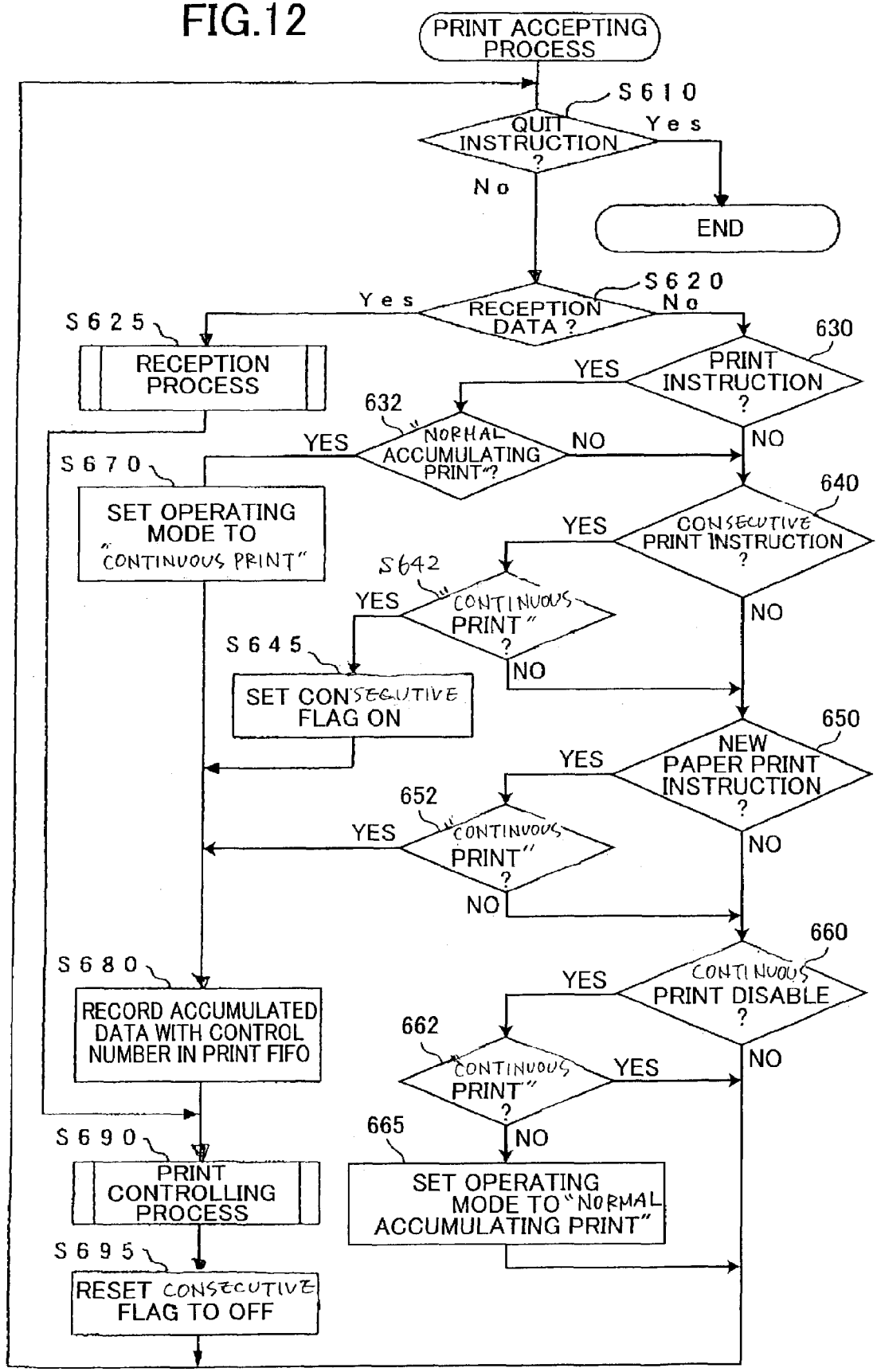
FIG. 12 is a flowchart representing of a print accepting process according to the present embodiment.

After completing the print controlling process of FIG. 15 in S690 of FIG. 12, the process proceeds to S695, where the CPU 111 resets the consecutive flag in the print control table T to its initial value of OFF. That is, when the consecutive flag is ON, the consecutive flag is changed to OFF. When the consecutive flag is already OFF, the consecutive flag is maintained OFF. Subsequently, the process returns to S610.

In FIG. 12, if the CPU 111 determines in S620 that no data for printing was received (S620:NO), then in S630, the CPU 111 determines whether or not a print instruction has been input. Here, the print instruction is input by a user through the operation panel 27 along with a designated control number. The print instruction is for printing accumulated data whose operation mode is the "normal accumulating print" mode, beginning from the top position on a new recording sheet. Here, accumulated data is received data for which accumulated data information is stored in a corresponding data file. If the print instruction is not received (S620:NO), then the process proceeds to S640. On the other hand, if the print instruction is received (S630:YES), then in S632, the CPU 111 determine whether or not the operating mode in the print control table T corresponding to the designated control number is the "normal accumulating print" mode. If not (S632:NO), then the process proceeds to S640. In this manner, the CPU 111 invalidates print instructions corresponding to control numbers set to the "continuous print" mode. On the other hand, if so (S632:YES), then the process proceeds to S670.

In S670, the operating mode for the designated control number is set to the "continuous print" mode. In other words, the operating mode in the print control table T corresponding to the designated control number is changed from "normal accumulating print" mode to "continuous print" mode.

In this manner, the user can temporarily change the print mode from the "normal accumulating print" mode to the "continuous print" mode. By doing so, the facsimile device 1 will not form images automatically without waiting for an instruction from the user so as not to annoying the user. Here, the user can change the print mode back to the "normal accumulating print" mode from the "continuous print" mode by inputting a continuous print disable instruction described later.

Next in S680, the CPU 111 registers the accumulated data information stored in the data file of the designated control number together with the control number into the print FIFO. Then, the CPU 111 executes the print controlling process in S690. In this case, the print controlling process will proceed in the following manner. That is, in FIG. 15, after executing the processes of S810 through S835, the CPU 111 determines in S840 that the consecutive flag is not ON (S840:NO). Then in S850, the print starting position is set to the default position, regardless of the print endpoint stored in the print control table T. In S860, a new print endpoint is stored. A sheet of recording paper is supplied in S870, and the recording unit 37 performs printing operations based on the print data beginning from the printing start position, which in this case is the top position on the recording paper. The entry corresponding to the data just printed is deleted from the print FIFO in S890. When S810 results in a negative determination (S810:NO), the print controlling process ends.

In S640 (FIG. 12), the CPU 111 determines whether or not a consecutive print instruction has been input by the user along with a designated control number. Here, the continuous print instruction is for printing accumulated data whose operation mode is the "continuous print" mode, beginning from the corresponding print endpoint stored in the print control table T. If not (S640:NO), then the process proceeds to S650. On the other hand, if so (S640:YES), then in S642, the CPU 111 determines whether or not the operating mode in the print control table T corresponding to the designated control number is the "continuous print" mode. If not (S642:NO), then the process proceeds to S650. In this manner, the CPU 111 invalidates the continuous print instruction for the control numbers whose operation mode is the "normal accumulating print" mode. On the other hand, if so (S642:YES), then the process proceeds to S645.

In S645, the CPU 111 sets the consecutive flag in the print control table T corresponding to the designated control number to ON. In S680, the CPU 111 records the corresponding accumulated data information stored in the data file into the print FIFO the along with the control number. In S690, the CPU 111 executes the print controlling process. In this case, the print controlling process will proceed in the following manner. That is, in FIG. 15, after executing the processes of S810 through S835, the CPU 111 determines in S840 that the consecutive flag is ON (S840:YES). Then, in S850, the print starting position is set to the print endpoint stored in the print control table T, and in S860, a new print endpoint is stored. A sheet of recording paper is supplied in S870, and then in S880, the recording unit 37 performs printing operations based on the current print data, beginning from the printing start point, which in this case is the print endpoint of the previous printing process. Therefore, the user can return the recording paper, onto which images have been printed in a previous printing, to the feed tray, enabling the facsimile device 1 to print next image in the blank space remaining on the recording paper without wasting this space. Then in S890, the CPU 111 deletes the entry corresponding to the data just printed from the print FIFO. When S810 results in a negative determination (S810:NO), then the print controlling process ends.

In S650 (FIG. 12), the CPU 111 determines whether or not the user has inputted a new paper print instruction from the operating panel 27 along with a designated control number. Here, the new paper print instruction is for printing the accumulated data whose operation mode is the "continuous print" mode, beginning from the top position on a new recording paper, regardless the print endpoint stored in the print control table T. If not (S650:NO), then the process proceeds to S660. On the other hand, if so (S650:YES), then the CPU 111 determines in S652 whether or not the operating mode in the print control table T corresponding to the designated control number is the "continuous print" mode. If not (S652:NO), then the process proceeds to S660. In this manner, the CPU 111 invalidates new paper print instructions for the control numbers whose operation mode is the "normal accumulating print" mode. On the other hand, if so (S652:YES), then the process proceeds to S680, where the accumulated data information stored in the data file corresponding to the designated control number is registered in the print FIFO along with the control number. Then, the print controlling process is executed in S680. In this case, the print control process will proceed in the following manner. That is, in FIG. 15, after executing the processes of S810 through S835, the CPU 111 determines in S840 that the consecutive flag is not ON (S840:NO). Then, in S845, the print starting position is set to the default position, regardless of the print endpoint stored in the print control table T. In S860, a new print endpoint is stored. A sheet of recording paper is supplied in S870, and the recording unit 37 performs printing operations based on the print data beginning from the printing start position, which in this case is the top position on the recording paper. The entry corresponding to the data just printed is deleted from the print FIFO in S890. When S810 results in a negative determination (S810:NO), the print controlling process ends.

In S660 of FIG. 12, the CPU 111 determines whether or not the user has inputted a continuous print disable instruction from the operating panel 27 along with a designated control number. If not (S660:NO), then the process returns to S610. On the other hand, if so (S660:YES), then in S662, the CPU 111 determines whether or not the operating mode in the print control table T corresponding to the designated control number is the "continuous print" mode. If so (S662: YES), then the process proceeds to S665. On the other hand, if not (S662:NO), then the process returns to S610. In this manner, the CPU 111 invalidates the continuous print disable instructions for the control numbers whose print mode is the "normal continuous print" mode.

In S665, the CPU 111 changes the operating mode in the print control table T corresponding to the designated control number from "continuous print" to "normal accumulating print". That is, by inputting the continuous print disable instruction, the user can set the operating mode from the "continuous print" to the "normal accumulating print".

According to the above embodiment, data of a type that should be provided promptly to the user is automatically downloaded form the web server 21. However, if thus downloaded data is categorized for the "continuous print" mode, then the downloaded data will not be automatically printed out. In other words, if the user does not desire to get the data automatically printed out, then the user can set the corresponding print mode to the "continuous print" mode. In this manner, the amount of consumed recording paper will be reduced. Further, even if the "normal accumulating mode" is selected, the facsimile device 1 printing only after a page worth of data in the same category is accumulated, although it is possible to print the data each time the data is received. Accordingly, the facsimile device 1 of the present embodiment can reduce the waste of recording paper. Further, when the user desires to get the data printed, the user can get the data printed by inputting the print instruction, the continuous print instruction, or the new paper print instruction. Accordingly, the user can obtain a printing result regardless of the amount of accumulated data. Also, because the user can designate a desired control number, the user can obtain a printing result based on data that is of a type required by the user.

The facsimile device 1 of the present embodiment prints data that has been received in a regular manner, without combining the data with other data, which is convenient when the user does not wish to form images based on combined received data, thereby making it easy and convenient to file related data. This prevents such problems as difficulty in managing printed material containing different types of unrelated data content.

Further, the user can obtain printed images based on accumulated received data by inputting the print instruction, the continuous print instruction, or the new paper print instruction through operations of the operating panel 27. Accordingly, the user can confirm content of received data any time desires, while reducing the amount of consumed recording paper by accumulating the received data.

This type of function is particularly convenient when the received data is of a type that should be provided to the user in real-time. While snapshots from a surveillance camera and the like are data of a type that should be provided quickly to a user, a device configured to print this data on recording paper each time the data is received will consume a large amount of recording paper. However, the facsimile device 1 can accumulate received data while the user is not checking data and can print images based on the received data and provide the printed material to the user when the user wishes to check the received data and inputs a print instruction indicating this desire. This can reduce the amount of consumed recording paper and provide printed material to the user without diminishing the value of the received data.

As described above, according to the facsimile device 1 of the present embodiment, it is possible, in the consecutive print mode, to form images from a print endpoint of the previous printing operations. Accordingly, after the user confirms the content of received data through the images printed on the recording paper, the user can return the recording paper to the feed tray, enabling the facsimile device 1 to print the next image in the blank space remaining on the recording paper without wasting this space.

Here, if the facsimile device is configured to form images based on target data for unrelated images on a single sheet of recording paper, this configuration may inconvenience the user when the user files the paper, as the paper cannot be easily categorized by data type. However, according to the facsimile device of the present embodiment, related images are formed on the same sheet.

While the invention has been described in detail with reference to specific embodiments thereof, it would be apparent to those skilled in the art that many modifications and variations may be made therein without departing from the spirit of the invention, the scope of which is defined by the attached claims.

For example, the web printing unit 110 in the embodiment described above is configured to convert received data to print data prior to directing the recording unit 37 to print images based on the received data. However, the web printing unit 110 can convert the received data immediately to print data upon receiving the data from an external source and save the print data in the RAM 115.

In the embodiment described above, received data is converted to print data in the print controlling process when the operating mode is set to the "continuous print" mode. However, the web printing unit 110 can be configured to convert received data to print data before entering the data in the print FIFO.

In the above described embodiment, the facsimile device 1 prints images when single-page-worth of data in the same category is accumulated. However, the facsimile device 1 could be configured to print images when more than a predetermined number of sets of data are received in the same category. In this case it is possible to prevent images from being interrupted in the middle of a data unit. Alternatively, the facsimile device 1 could be configured to print images when two-page-worth or more of data in the same category is accumulated.

What is claimed is:

1. An image forming device comprising:
   an image forming unit that forms images on a recording medium;
   a supply unit that supplies the recording medium to the image forming unit;
   a receiving unit that receives image data via a network from an external source;
   a memory that stores the image data;
   a storing unit that stores the image data into the memory each time the receiving unit receives the image data by appending the image data to any image data already stored in the memory;
   a control unit that controls the image forming unit and the supply unit;
   a determining unit that determines whether or not a data amount of the image data stored in the memory is equal to or greater than a predetermined amount; and
   an input unit that inputs the image data stored in the memory into the control unit when the determining unit determines that the data amount is equal to or greater than the predetermined amount, the input unit not inputting the image data stored in the memory into the control unit when the determining unit determines that the data amount is lower than the predetermined amount, wherein upon reception of the image data, the control unit controls the supply unit to supply the recording medium to the image forming unit and controls the image forming unit to form the images based on the image data on the recording medium supplied by the supply unit.

2. The image forming device according to claim 1, wherein the input unit collectively inputs the image data in a predetermined unit into the control unit when the determining unit determines that the data amount is equal to or greater than the predetermined amount.

3. The image forming device according to claim 1, wherein the control unit stores a print endpoint into the memory, the print endpoint indicating a position on the recording medium at which the image forming unit has completed forming the images, and wherein upon reception of the image data, the control unit controls the supply unit to supply the recording medium to the image forming unit and controls the image forming unit to form the images based on the image data beginning from the print endpoint on the recording medium.

4. The image forming device according to claim 1, further comprising:

an operation unit that enables a user to input various commands; and a manual input unit that, upon reception of a print command input through the operation unit, inputs the image data stored in the memory into the control unit, regardless of an amount of the image data.

5. The image forming device according to claim 4, further comprising:

a data sorting unit that sorts the image data received by the receiving unit into one of a plurality of predetermined classes, wherein:

the determining unit determines whether or not the amount of the image data stored in the memory is equal to or greater than the predetermined amount for each class; and when the determining unit determines that amount of the image data for a class is equal to or greater than the predetermined amount, the input unit inputs the image data of the class into the control unit.

6. The image forming device according to claim 5, wherein upon reception of the print command and a class specifying data inputted through the operation unit by the user, the manual input unit inputs the image data stored in the memory that belongs to a class specified by the class specifying data into the control unit, regardless the amount of the image data.

7. The image forming device according to claim 6, further comprising an individual input unit that inputs the image data that belongs to none of the predetermined classes into the control unit, regardless the amount of the image data.

8. The image forming device according to claim 4, wherein upon reception of a disable instruction command inputted through the operation unit by the user, the manual input unit prohibits the input unit from inputting image data into the control unit until a releasing command inputted through the operation unit by the user is received.

9. The image forming device according to claim 1, further comprising:

a data sorting unit that sorts the image data received by the receiving unit into one of a plurality of predetermined classes, wherein:

the determining unit determines whether or not an amount of image data stored in the memory is equal to or greater than a predetermined amount for each class; and when the determining unit determines that the amount of image data for a class is equal to or greater than the predetermined amount, the input unit inputs the image data of the class into the control unit.

10. The image forming device according to claim 1, further comprising:

an operation unit that enables a user to input various commands, wherein the input unit has an accumulating mode and a continuous mode, the input unit in the accumulating mode automatically inputting the image data into the control unit when the determining unit determines that the data amount is equal to or greater than the predetermined amount, and the input unit in the continuous mode inputting the image data into the control unit when a print command is inputted through the operation unit by the user, regardless the data amount of the image data.

11. The image forming device according to claim 10, wherein:

the control unit stores a print endpoint into the memory, the print endpoint indicating a position on the recording medium at which the image forming unit has completed forming images;

the print command includes a consecutive print command and a non-consecutive print command;

upon reception of image data, the control unit controls the supply unit to supply the recording medium to the image forming unit and controls the image forming unit to form the images based on the image data beginning from the print endpoint on the recording medium when the consecutive print command is inputted through the operation unit; and upon reception of image data, the control unit controls the supply unit to supply the recording medium to the image forming unit and controls the image forming unit to form the images based on the image data beginning from a top position on the recording medium when the non-consecutive print command is inputted through the operation unit.

12. A computer readable storage medium that stores a computer-executable program for controlling an image forming device, the program comprising:

instructions for storing image data into a memory each time a receiving unit receives image data via a network from an external source, by appending the image data to any image data already stored in the memory;

instructions for determining whether or not a data amount of the image data stored in the memory is equal to or greater than a predetermined amount;

instructions for inputting the image data stored in the memory into a control unit collectively when the data amount is determined to be equal to or greater than the predetermined amount, and for not inputting the image data stored in the memory into the control unit when the data amount is determined to be lower than the predetermined amount; and instructions for supplying the recording medium to an image forming unit and controlling the image forming unit to form images on the recording medium based on the image data that has been inputted to the control unit in the instructions for inputting.

13. The storage medium according to claim 12, wherein in the instructions for inputting the image data in a predetermined unit is collectively inputted into the control unit.

14. The storage medium according to claim 12, further comprising:
   instructions for storing a print endpoint into the memory each time the image forming unit completes forming the images, the print endpoint indicating a position on the recording medium at which the image forming unit has completed forming the images,
   wherein in the instructions for supplying, the image forming unit is controlled to form the images based on the image data beginning from the print endpoint on the recording medium.

15. A control method of controlling an image forming device, the control method comprising:
   storing image data into a memory each time a receiving unit receives image data via a network from an external source, by appending the image data to any image data already stored in the memory;
   determining whether or not a data amount of the image data stored in the memory is equal to or greater than a predetermined amount;
   inputting the image data stored in the memory into a control unit collectively when the data amount is determined to be equal to or greater than the predetermined amount, and not inputting the image data stored in the memory into the control unit when the data amount is determined to be lower than the predetermined amount; and
   supplying a recording medium to an image forming unit and controlling the image forming unit to form images on the recording medium based on the image data that has been inputted to the control unit in the inputting the image data.

16. The control method according to claim 15, wherein in the inputting the image data, the image data in a predetermined unit is collectively inputted into the control unit.

17. The control method according to claim 15, further comprising:
   storing a print endpoint into the memory each time the image forming unit completes forming the images, the print endpoint indicating a position on the recording medium at which the image forming unit has completed forming images,
   wherein in the supplying the recording medium, the image forming unit is controlled to form the images based on the image data beginning from the print endpoint on the recording medium.

* * * * *